(12) United States Patent
Barrett

(10) Patent No.: US 10,253,749 B2
(45) Date of Patent: Apr. 9, 2019

(54) WAVE ENERGY GENERATION DEVICE AND METHODS OF USING THE SAME

(71) Applicant: Kevin M. Barrett, Rancho Santa Fe, CA (US)

(72) Inventor: Kevin M. Barrett, Rancho Santa Fe, CA (US)

(*) Notice: Subject to any disclaimer, the term of this patent is extended or adjusted under 35 U.S.C. 154(b) by 197 days.

(21) Appl. No.: 15/452,593

(22) Filed: Mar. 7, 2017

(65) Prior Publication Data

US 2017/0175701 A1 Jun. 22, 2017

Related U.S. Application Data

(63) Continuation-in-part of application No. 14/817,108, filed on Aug. 3, 2015, now Pat. No. 9,587,722.

(60) Provisional application No. 62/349,594, filed on Jun. 13, 2016, provisional application No. 62/032,170, filed on Aug. 1, 2014.

(51) Int. Cl.
*F03B 13/18* (2006.01)
*H02K 7/18* (2006.01)
*H02K 7/02* (2006.01)
*H02K 7/116* (2006.01)

(52) U.S. Cl.
CPC ........ *F03B 13/1885* (2013.01); *F03B 13/182* (2013.01); *H02K 7/1853* (2013.01); *F05B 2210/16* (2013.01); *F05B 2220/706* (2013.01); *F05B 2240/97* (2013.01); *F05B 2260/5032* (2013.01); *H02K 7/025* (2013.01); *H02K 7/116* (2013.01); *Y02E 10/38* (2013.01)

(58) Field of Classification Search
CPC .. F03B 13/1885; F03B 13/182; H02K 7/1853
USPC .............................................. 290/1 C, 42, 53
See application file for complete search history.

(56) References Cited

U.S. PATENT DOCUMENTS

| | | | |
|---|---|---|---|
| 7,239,038 B1 * | 7/2007 | Zimmerman | F03B 13/20 290/42 |
| 7,245,041 B1 | 7/2007 | Olson | |
| 7,839,009 B2 * | 11/2010 | Rink | F03B 13/264 290/43 |
| 8,276,377 B2 | 10/2012 | Patton | |
| 8,310,079 B2 | 11/2012 | Kingston | |
| 2006/0232074 A1 | 10/2006 | Chiasson | |
| 2008/0048455 A1 | 2/2008 | Carney | |
| 2008/0191485 A1 * | 8/2008 | Whittaker | F03B 13/182 290/53 |

(Continued)

*Primary Examiner* — Viet Nguyen
(74) *Attorney, Agent, or Firm* — Scott Davison; Musick Davison, LLP

(57) ABSTRACT

A device is provided that converts random movement of extrinsic oscillation from an ocean wave into purposeful movement, such as torque or other motion that can be used to generate electricity. This device may include but is not limited to two major components: 1) a collection unit and 2) a transmission unit. The collection unit represents the interactive part of the device that interfaces with an extrinsic force which provides the randomized kinetic motion that is translated by an actuating arm connected with the transmission unit into pivoting bidirectional movement along at least two directional axes, and may include a series of connected pivoting arms of different lengths. The transmission unit is the portion of the device that converts the pivoting directional movement of the actuating arm or arms into rotation of a drive shaft that is then converted into purposeful torque, and thus, electricity.

19 Claims, 25 Drawing Sheets

(56) References Cited

U.S. PATENT DOCUMENTS

| | | | |
|---|---|---|---|
| 2009/0056327 A1* | 3/2009 | Raikamo | F03B 13/181 |
| | | | 60/506 |
| 2009/0224553 A1 | 9/2009 | Williams | |
| 2010/0034670 A1 | 2/2010 | Smith | |
| 2010/0140944 A1 | 6/2010 | Gardiner et al. | |
| 2012/0074702 A1* | 3/2012 | Ahdoot | F03B 13/182 |
| | | | 290/53 |
| 2012/0235413 A1 | 9/2012 | Piccinini | |
| 2012/0235417 A1 | 9/2012 | Arntz | |
| 2012/0292915 A1 | 11/2012 | Moon | |
| 2013/0009402 A1 | 1/2013 | Williams | |
| 2013/0113215 A1 | 5/2013 | Corcoran | |
| 2013/0127168 A1 | 5/2013 | Dragic | |
| 2013/0140943 A1* | 6/2013 | Jean | F03B 11/00 |
| | | | 310/300 |
| 2013/0200626 A1 | 8/2013 | Sidenmark et al. | |
| 2013/0269333 A1* | 10/2013 | Williams | F03B 13/182 |
| | | | 60/506 |
| 2014/0070543 A1 | 3/2014 | Massimo | |
| 2014/0097617 A1 | 4/2014 | Rohrer | |
| 2014/0217736 A1 | 8/2014 | Peng | |
| 2014/0239642 A1 | 8/2014 | Peng et al. | |
| 2014/0239643 A1* | 8/2014 | Orlando | F03B 13/20 |
| | | | 290/53 |
| 2014/0375058 A1 | 12/2014 | Chan | |
| 2015/0021918 A1* | 1/2015 | Greco | F03B 13/1815 |
| | | | 290/53 |
| 2015/0322914 A1* | 11/2015 | Zuo | F03B 13/18 |
| | | | 60/497 |
| 2016/0218594 A1 | 7/2016 | Wickett | |
| 2018/0100481 A1* | 4/2018 | Ohlsson | F03B 13/1885 |

\* cited by examiner

WAVE ENERGY GENERATION DEVICE AND METHODS OF USING THE SAME

BACKGROUND

Field of the Invention

Devices and methods provided herein relate generally to devices that convert kinetic energy into electricity, and more particularly to pivoting arms that convert random movement of extrinsic oscillation into purposeful movement that can be used to generate electricity, and various methods for their use.

Related Art

In recent years, there has been a substantial influx in the 'green energy' market related to devices and methods for producing energy from fuel sources other than fossil fuels. The burning of fossil fuels has been the convention for providing both mechanical energy as well as electrical energy. In particular, many large scale electric generators use the burning of fossil fuels to create and convert mechanical energy to electrical energy. The reliance on fossil fuels in both large and small scale applications, is driving a depletion of many conventional fossil fuel sources, and may soon be unsustainable to meet our large energy demands. It is also a widely-held belief among scientists that the burning of these fossil fuels is adding to climate change. As a result, we believe that now is the time for innovation in energy production devices and methods which employ sustainable alternative fuel sources.

Conventional alternative energy devices known today include wind turbines, solar cells, geothermal and hydro-electric generators and others. These innovations have provided a huge step toward the long-term goal of cutting our reliance on fossil fuels, however, they have many drawbacks. These methods can be costly, both in monetary terms and in the energy consumption required to manufacture them. A wind turbine or solar farm typically costs millions of dollars to build, install, and maintain and are often deemed unsightly. In addition, the unpredictability of wind and weather can cause these units to go unused for quite some time. Hydro-electric plants rely on the proximity of a water source and the building of a dam which can be destructive to the local habitat.

Harvesting natural resources and developing sustainable energy sources that provide viable alternatives to fossil fuels calls for the creation of specialized devices. Therefore, it is desirable to develop devices which produce electricity without the limitations of fossil fuels and the inflexibility and unpredictability of current green energy sources.

SUMMARY

Embodiments described herein provide for a device that converts random movement of extrinsic oscillation into purposeful movement—such as torque or other motion—that can be used to generate electricity. This device may include but is not limited to two major components: 1) a collection unit, and 2) a transmission unit. The collection unit represents the interactive part of the device that interfaces with an extrinsic force which provides the randomized kinetic motion that is translated by an actuating arm connected with the transmission unit into pivoting bidirectional movement along at least two directional axes, and may include a series of connected pivoting arms of different lengths. The transmission unit is the portion of the device that converts the pivoting directional movement of the actuating arm or arms into rotation of a drive shaft that is then converted into purposeful torque, and thus, electricity.

Specifically, one embodiment of the device provides the ability to capture and convert the random movement of an extrinsic body into purposeful motion, such as torque, that can, for example drive a generator shaft to produce electricity. The extrinsic body producing this movement may include numerous forms such as water, wind, human, animal, mechanical, or other bodies. The movement may include oscillation, rotation and/or vibration.

In one embodiment, the collection unit of the device interfaces with a prime mover to convert its motion into the movement of an actuating arm. This actuating arm (connected at one end to the collection unit and at the other end to the transmission) can move at the transmission end along x, y and z axes, or any compound angle of the three axes. The transmission then converts the actuating arm motion into directional rotation of an output shaft which in turn spins a generator/alternator to produce electricity. Each of these components addresses disadvantages of existing devices in unique ways which will be illustrated and described throughout this document.

In one embodiment, an apparatus for converting wave movement in a body of water to electrical power comprises: a collection unit configured to capture randomized kinetic energy from a wave; an actuating arm connected with the collection unit to translate the randomized kinetic energy into pivoting directional movement in at least two directional axes; a first drive shaft in rotating connection with the actuating arm to translate the pivoting bidirectional movement of the actuating arm along a first directional axis into bidirectional torque of the first drive shaft; a transmission unit sealably enclosing a substantial portion of the first drive shaft; an electrical generation unit enclosed within the transmission unit and in geared connection with the first drive shaft to generate an electrical charge from the bidirectional torque; and at least one external support arm in rotating connection with the transmission unit at a connection point, wherein the at least one external support arm anchors the transmission unit in the body of water, wherein the external support arm allows for pivoting bidirectional movement of the transmission unit about the connection point along a second directional axis generally perpendicular to the first directional axis.

In another embodiment, a method of converting wave movement to electrical power comprising the steps of: capturing randomized kinetic energy from a wave via a collection unit; translating the randomized kinetic energy into pivoting directional movement of the collection unit in at least two directional axes via an actuating arm in fixed connection with the collecting unit and in pivoting rotating connection with a transmission unit; transforming the pivoting directional movement on a first directional axis into bidirectional torque via a first drive shaft; converting the bidirectional torque into an electrical charge via a first electrical generation unit enclosed within the transmission unit; and transforming the pivoting directional movement on a second directional axis approximately perpendicular to the first directional axis into rotational movement at a connection point between the transmission unit and at least one external support arm anchoring the transmission unit in the body of water.

This unit provides a basis for future developments related to alternative power generation. Described below are multiple embodiments relating to methods of use of the device; however, many additional applications and uses are possible. Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a device that converts random movement of extrinsic oscillation into purposeful movement, such as torque or other motion that can be used to generate electricity. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Four embodiments of this device include, but are in no way limited to, the following applications illustrated in the various figures herein, which correspond to potential locations for the device based on varying types of extrinsic bodies which can act upon the device to convert energy.

The resulting transmission can convert inconsistent, erratic or random movement of the articulating arm in any direction, left to right or right to left on the x-axis, as well as, top to bottom or bottom to top on the y-axis, as well as in to out or out to in on the z-axis or any combination of these angles of movement into unidirectional rotation of a drive shaft. There are many potential uses for this device, such as to spin a generator/alternator, flywheel, attach directly to a pump, or many other potential uses.

Additionally, the embodiments described herein are designed to be scalable to various sizes depending on their specific application and desired power generation. E.G. A large device may be placed in a body of water to translate the movement of the body of water into a significant amount of power for industrial or commercial uses, while a portable device may be designed which simply scales down the device for attachment to a moving object—such as a vehicle or even a person—in order to generate smaller amounts of power for low power applications.

I. Underwater Application—Multiple Directions of Flow

Figure 1:
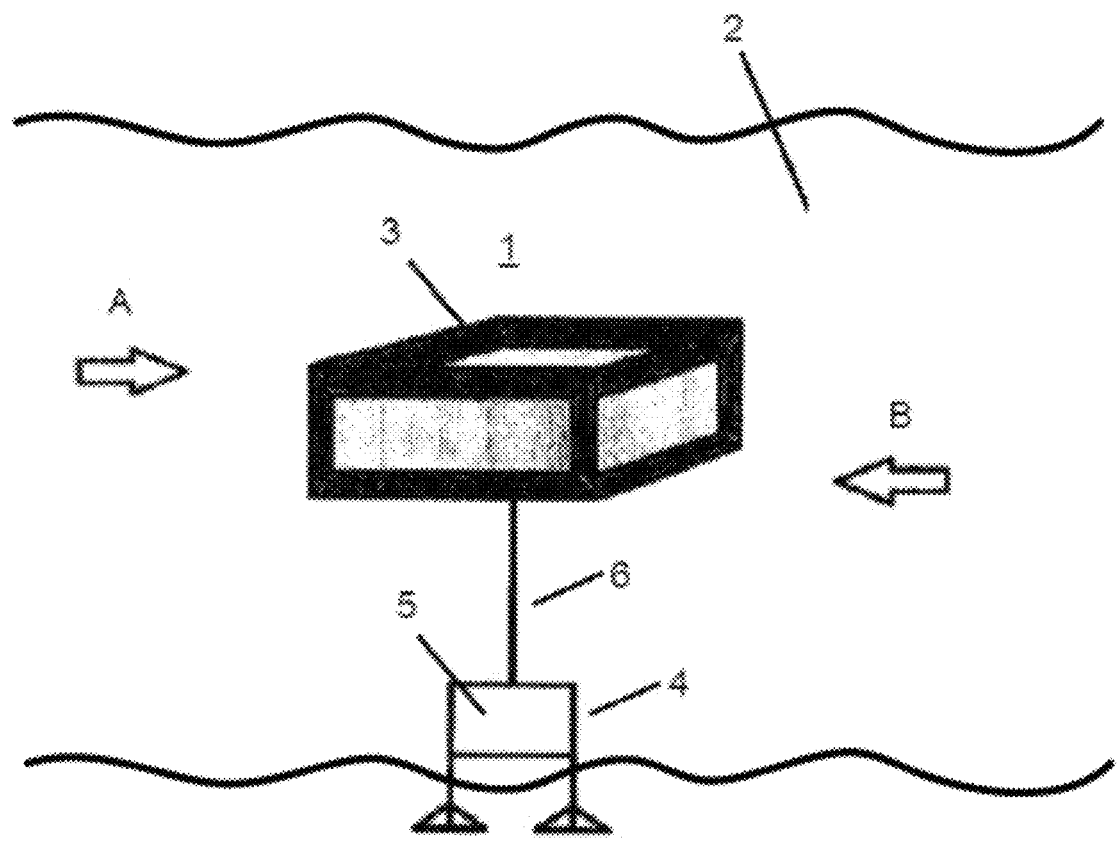
FIG. 1 is an illustration of an undersea collection unit, according to an embodiment of the invention.
Figure 2:
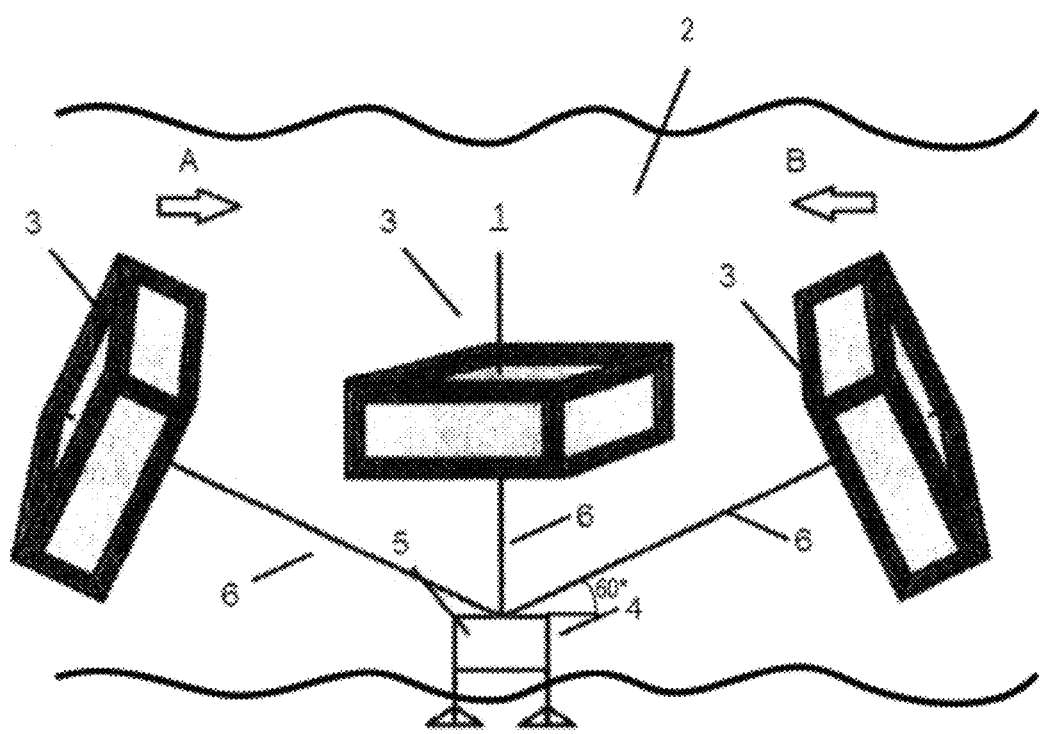
FIG. 2 illustrates a rotation of movement of the undersea collection unit, according to an embodiment of the invention.

FIG. 1 illustrates one embodiment of the device 1 in an underwater environment 2 where the movement of water occurs in multiple different directions, such as in the ocean or a large lake. A collection unit 3 is placed within the underwater environment 2 and secured to a substantially stationary body 4 via an articulating arm 6. The substantially stationary body 4 is attached to a floor of the body of water, and a transmission unit 5 is positioned below the collection unit within the stationary body. The back and forth, horizontal movement of the prime mover (ocean waves in this case), as illustrated by the directional arrows A and B pushing on the collection unit, will cause two types of movements, as illustrated in FIG. 2:

1) The pivoting of the actuating arm, such that at maximum pivot the flow is substantially parallel to the actuating arm and at the mid-point of a pivot is substantially orthogonal to the actuating arm, and 2) The compression and expansion of the distance between the collection unit (as it slides up and down the actuating arm) as it moves towards and away from the transmission.

These motions will provide the kinetic movement to the transmission to be converted.

The collection unit may take on one or more shapes and sizes configured to capture as much movement from the Prime Mover as possible. In one embodiment illustrated in FIG. 3, the collection unit is a "tesseract," or cube with fins. The tesseract contains multiple concave sides which will increase the amount of resistance caused by the water moving in almost any direction against it.

The average distance of the collection unit from the transmission can be varied based on conditions to optimize efficiency and/or safety. For example, each ocean wave transfers more energy and hence causes more movement of water closer to the surface than at the ocean floor. Therefor being able to move the collection unit closer to the surface will expose it to more movement and more energy. If conditions become too powerful for the device, the collection unit can be lowered down the actuating arm away from the surface to a less powerful environment closer to the ocean floor. NOTE: Maximum height will be determined by the length of the actuating arm and minimum height will be determined by the size of the collection unit and stationary body so as to avoid contact between the two.

In addition to distance adjustments of the collection unit along the actuating arm from the transmission to optimize efficiency and/or safety, the transmission and generator loads can also be geared/adjusted to optimize efficiency and safety e.g., In heavy conditions resistance can be increased by increasing loads or reducing gear sizes to increase rotation speeds and thereby extract more power from the waves. If the forces increase beyond safe levels these techniques can be used to reduce power production and prevent overloading or damage to the system.

II. Underwater Application—Single Direction of Flow

Figure 4:
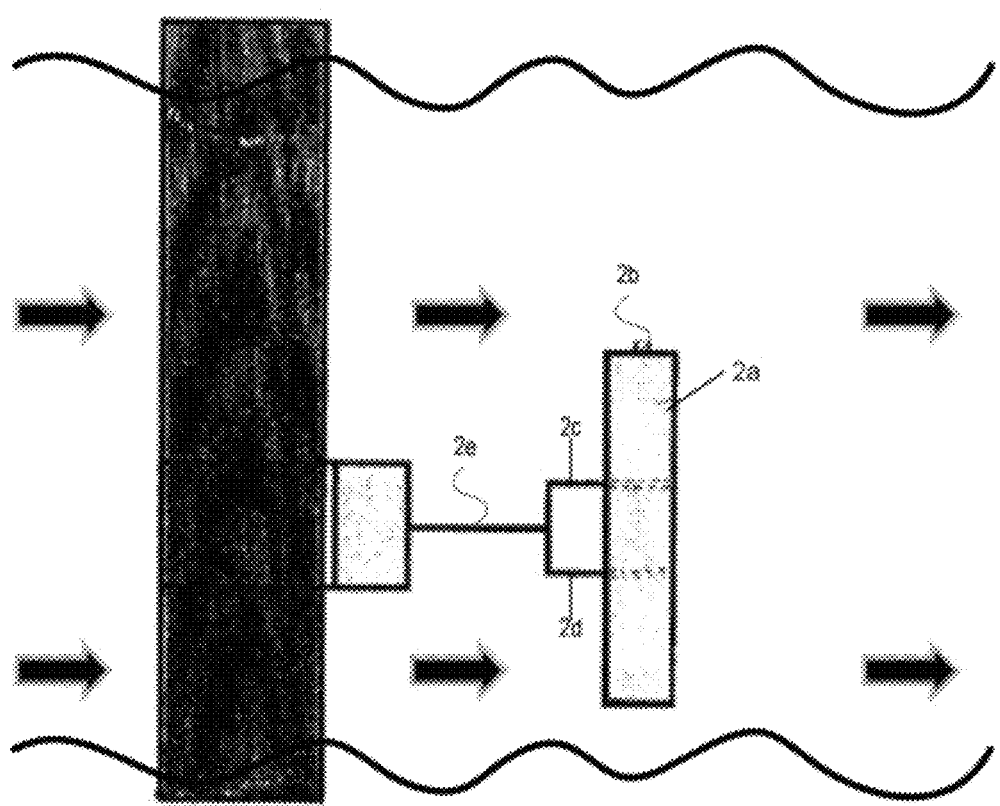
FIG. 4 is an illustration of a river collection unit, according to an embodiment of the invention.

FIG. 4 illustrates one embodiment of the device in an underwater environment where the Prime Mover (flow of water) moves in only one direction (as indicated by the directional arrows), such as a river, stream, irrigation channel, pipeline, etc. In one embodiment, the substantially stationery body may extend vertically from a floor of the body of water (e.g., a bridge pylon) and therefore perpendicular to the flow of water. The unit may be secured to a midpoint of the substantially stationary body such that the transmission is typically positioned horizontally and perpendicular to the collection unit. The movement of the Prime Mover is primarily in one direction (e.g. flowing river water) and is substantially parallel to an articulating arm connecting the collection unit with the transmission. In addition to the existing force of the flow of water, the turbulence produced downstream of the stationary body will produce additional kinetic movement available to be converted, as illustrated by the fluid flow diagrams in FIG. 6A and FIG. 6B.

Figure 5:
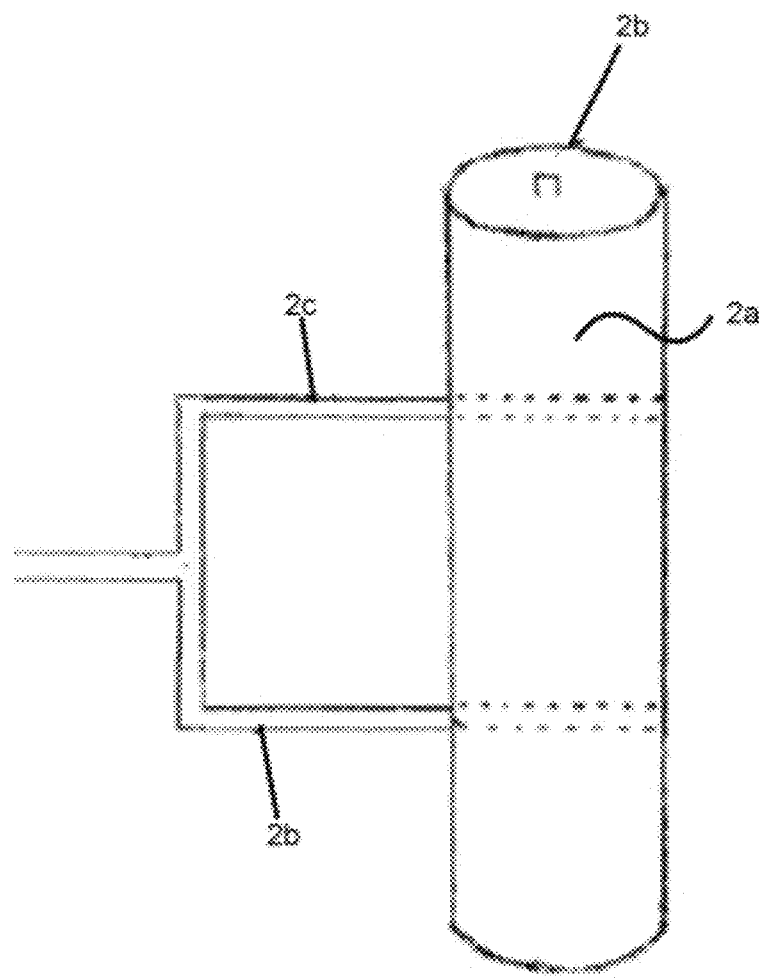
FIG. 5 illustrates a collection unit in the shape of a cylinder, according to one embodiment of the invention.

The collection unit may again take on various shapes and sizes. In one embodiment, the collection unit shape is similar to the shape of the vortexes produced in FIG. 6B which is a cylinder, as illustrated in FIG. 5. The distance of the collection unit from the transmission can be varied based on conditions to optimize efficiency and/or safety, and to provide a desired amount of horizontal movement. The transmission, generator can also be geared/adjusted to optimize efficiency and safety.

III. Portable Application—Omnidirectional Movement

Figure 7A:
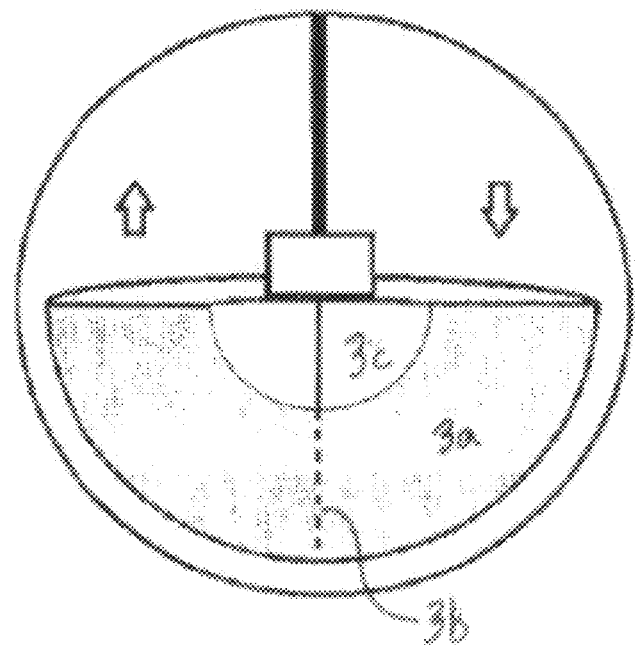
FIGS. 7A and 7B are illustrations of a portable collection unit, according to an embodiment of the invention.
Figure 7B:
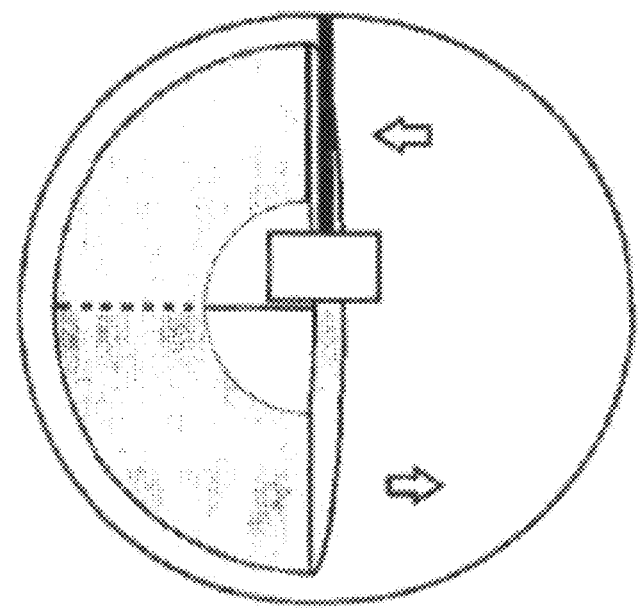

FIG. 7A and FIG. 7B illustrate one embodiment of an enclosed unit where the collection unit and transmission are completely enclosed within a housing. In this embodiment, the unit may be secured to or placed in the Prime Mover. The transmission is positioned above the collection unit (which in this case is a pendulum weight), whereby the whole unit moves with the prime mover. This movement will cause a relative swinging or vibration of the pendulum versus the transmission which will produce the kinetic movement to be converted. The collection unit may be many shapes. The preferred collection unit shape is a "Pendulum bowl." This is the shape of the weight depicted in FIGS. 7A and 7B.

The enclosed unit is therefore portable and capable of being mounted or placed in any location where it can be acted on by randomized kinetic energy to generate electrical energy. The distance of the collection unit from the transmission can be varied based on conditions to optimize efficiency and/or safety. The transmission and generator can also be geared/adjusted to optimize efficiency and safety.

IV. Attached Application—Omnidirectional Movement

Figure 8:
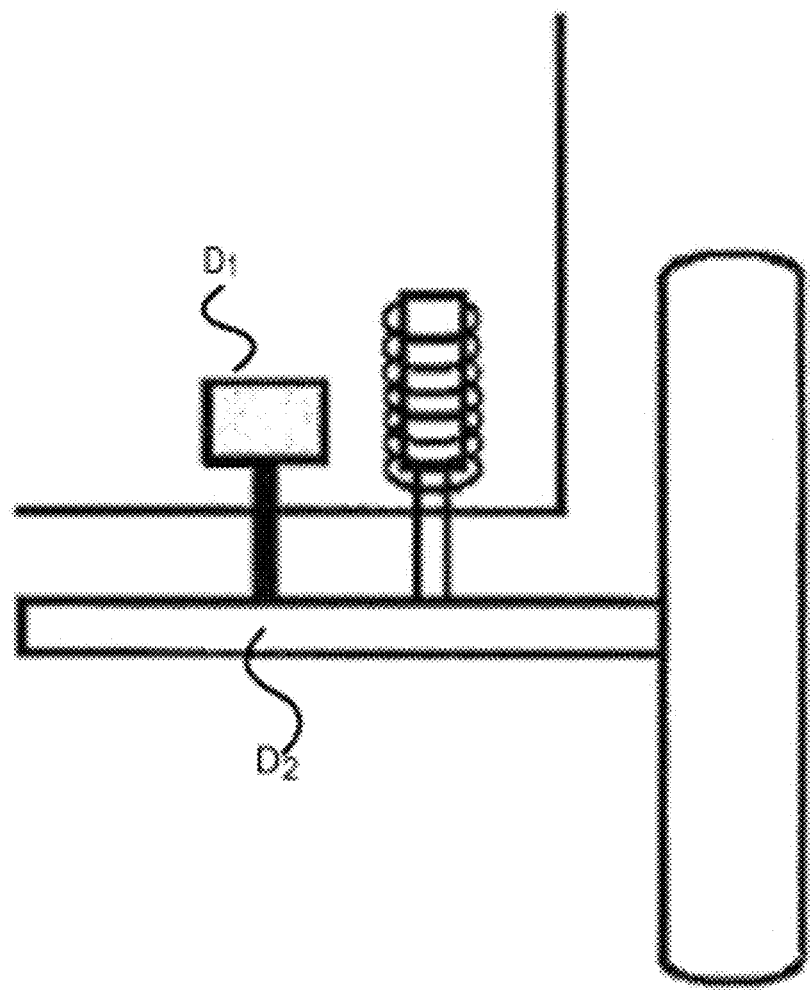
FIG. 8 illustrates the collection unit positioned between two parts of a prime mover; according to an embodiment of the invention.

Another embodiment illustrated in FIG. 8 shows how the unit may be secured to a Prime Mover (e.g., the chassis of a vehicle), and the transmission is positioned to attach the articulating arm to any other part of the Prime Mover (e.g., the vehicle axle) or any other object that will offer relative movement to the Prime Mover, as illustrated in FIG. 8. This relative motion will provide the kinetic energy to be converted. The length of the articulating arm can be varied based on conditions to optimize efficiency and/or safety. The transmission and generator can also be geared/adjusted to optimize efficiency and safety.

V. Collection Units

The collection units may be any shape or size, and be positioned in any one of a variety of environments. The distances, angles, weights and attachment points may be adjusted in order to optimize the conversion of randomized kinetic energy in the environment in which the device is placed. Non-limiting examples of several different collection units is provided below.

A. Tesseract

Figure 3:
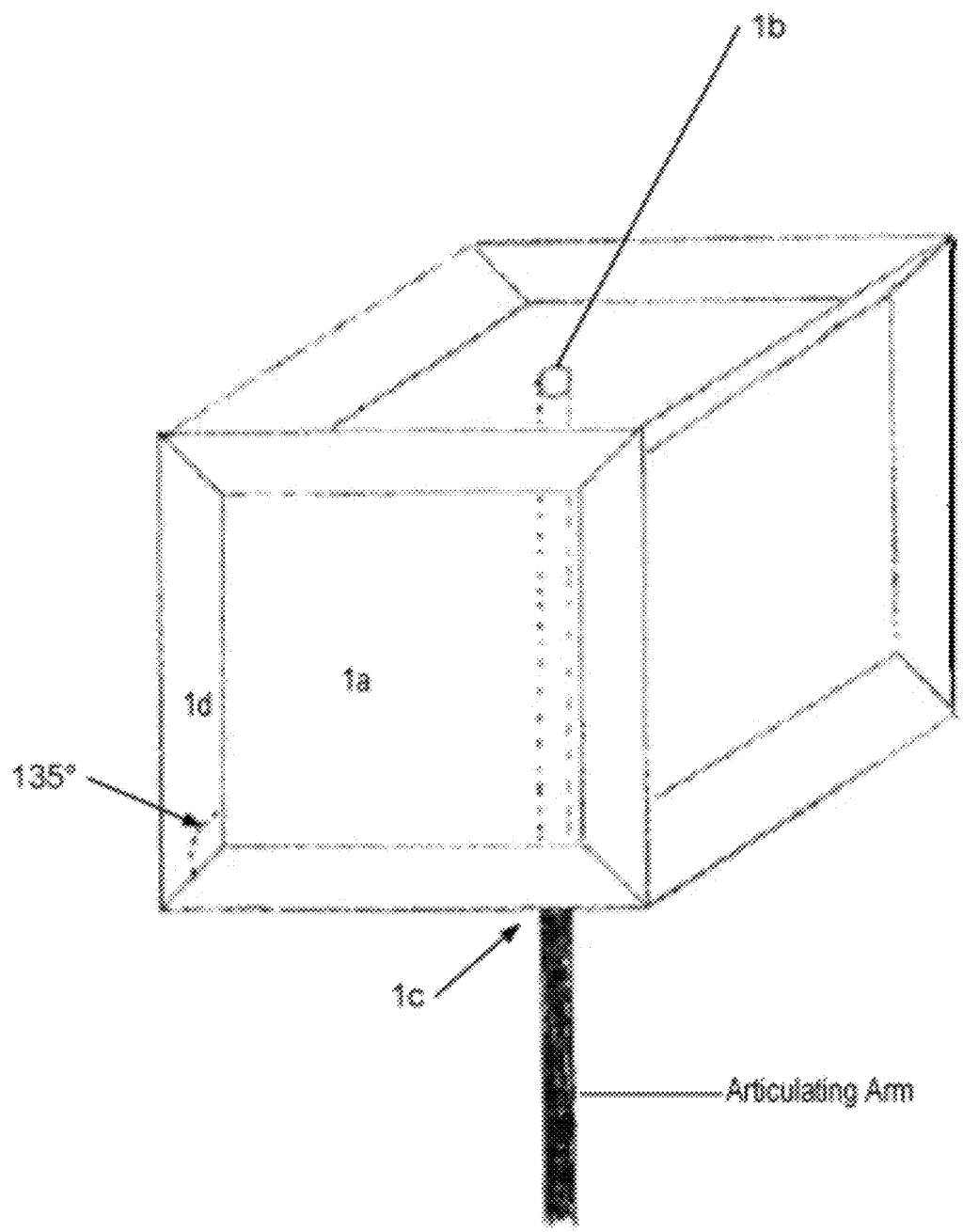
FIG. 3 illustrates a collection unit in the shape of a tesseract, according to one embodiment of the invention.

FIG. 3 illustrates one embodiment of a tesseract, which may include a sealed hollow central cube (1a) (note the cube may be rectangular or other geometric shape) with an internal core (1b) that allows the articulating arm to pass through it. This central cube provides buoyancy based on the amount of gas within it and an attachment point for the articulating arm (1c). The cube can move up or down the articulating arm (via mechanical or electrical adjustment) adjusting its distance from the transmission. In one embodiment, each edge of the cube has an extension wing (1d) at approximately 135 degrees that is connected to the wing next to it (1e). This forms a dynamic shape is known to the inventors as a "Tesseract." This shape is uniquely suited to capture horizontal wave motion no matter its angle to the prevailing wave force and convert that motion into movement of an articulating arm.

The buoyancy of the central cube can adjust based on conditions and will act to raise the collection unit to the vertical position. Additionally, at full buoyancy the whole unit can float, which allows for towing and lowering the unit into position for operation and facilitates easier access for maintenance.

As the tesseract collection unit moves with the waves and has no exposed moving parts it poses minimal risk to marine life (e.g., unlike spinning turbines). Fish can swim up to or onto the unit without harm.

The kinetic forces that drive this collection unit are the back and forth horizontal wave motions that move the collection unit as depicted in FIG. 2: Assume the articulating arm is in an almost horizontal position (approximately 160 degrees to the top of the transmission and to the right). This may be the case just after a wave has passed moving to the right. The sequence of motions that follow are:

1) The wave motion stops briefly and then reverses direction to the left. Due to the angle of the actuating arm, the wave's initial primary force pushes the collection unit in (down the actuating arm) towards the transmission (i.e. "in" on the z-axis).

2) At the same time, due to the shape of the tesseract, the wave starts to pivot the actuating arm towards vertical. As the angle of the actuating arm decreases from 160 towards 90 degrees to the top of the transmission, the primary wave force progressively decouples from the z-axis and simultaneously engages in some combination of the x and y axes depending on the orientation of the specific wave action.

3) Once the actuating arm passes 90 degrees and moves back towards horizontal in the opposite direction (i.e. to the left), the wave force now progressively decouples from the x, y axes and re-engages the z-axis moving the collection unit out (up the actuating arm) away from the transmission (i.e. "out" on the z-axis) until either the maximum limit of z-axis is reached or the wave motion stops. The process repeats in the opposite direction.

B. Cylindrical Paddle

FIG. 5 illustrates a collection unit described as a cylindrical paddle. The cylindrical tube (2a) is placed in a flowing fluid, designed to capture the maximum force of that flowing fluid with an internal core (2b) that allows for buoyancy. This tube connects to the transmission via at least one or more articulating arms (2c and 2d), as shown in FIG. 4. The tube can move back, forth, in and out on the articulating arms. It can also adjust its average distance from the transmission (via mechanical or electrical adjustment), to increase efficiency and/or safety.

Figure 6A:
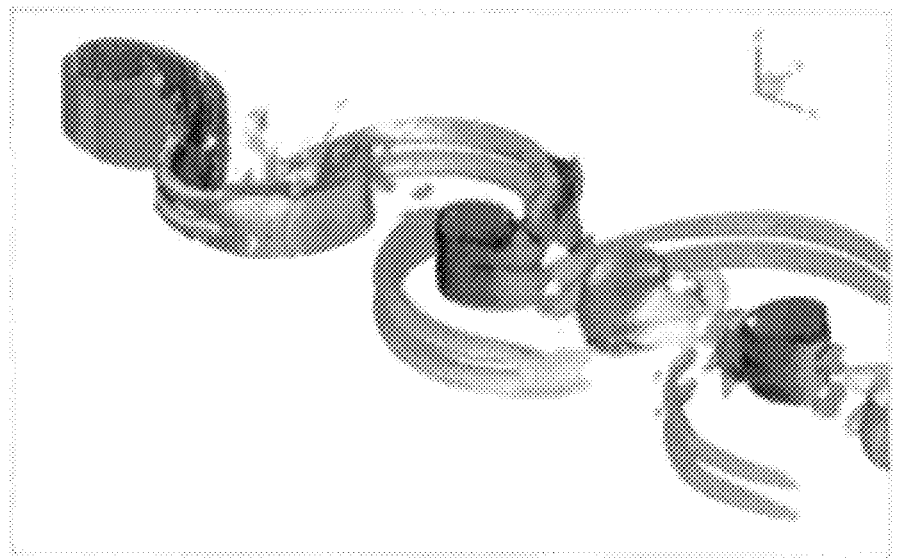
FIGS. 6A and 6B are illustrations of fluid flow diagrams illustrating turbulence created by a cylindrical object, according to an embodiment of the invention.
Figure 6B:
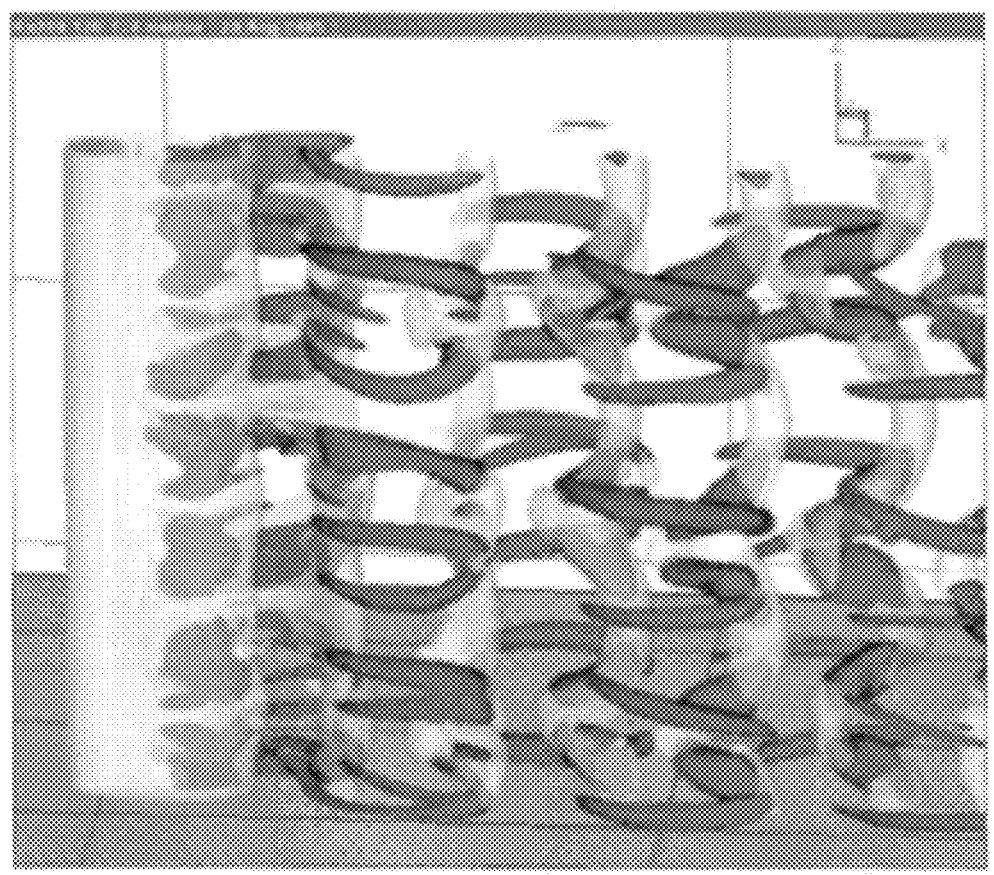

As the flow of fluid is primarily parallel to the articulating arm (2e) and orthogonal to this collection tube, the back, forth, in and out forces acting on this paddle to move the articulating arm occur as a result of the following principles of fluid dynamics, illustrated in the fluid flow diagrams of FIG. 6A and FIG. 6B. The study of fluid dynamics teaches that the fluid flow around stationary objects causes turbulence behind those objects. These forces are impacted by many factors and can change based on density of the fluid, viscosity, speed of flow, size of objects, depth, boundary layers, proximity to other objects, salinity, temperature, and other factors influencing the Reynolds number. However, it is this turbulence that provides the kinetic forces that drive the unit.

A more detailed look at this turbulence shows a relatively consistent back and forth flow that changes directions at angles oblique (sometimes at right angles or even in the opposite direction) to the primary direction of the fluid flow (FIG. 6A and FIG. 6B). This consistent back and forth flow has been well documented and often causes alternate vortexes to be formed in one direction and then in the opposite direction. These are often referred to as a Von Karman Vortex Street. The shape of these vortexes and the turbulent flow is impacted by the shape of the body causing them (i.e., a vertical column will tend to cause a series of vertical columns of vortexes and associated turbulence in vertical columns).

Figure 9:
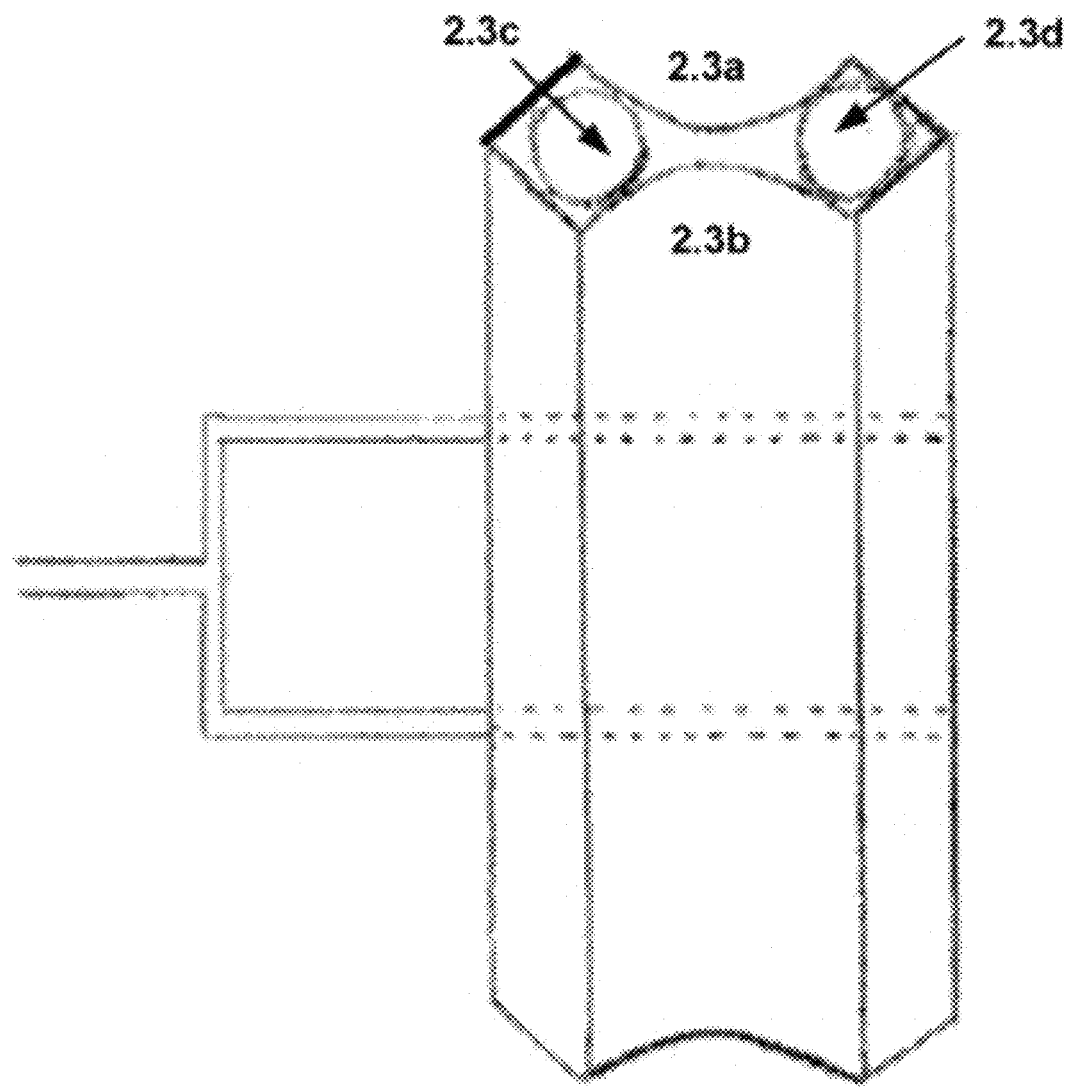
FIG. 9 illustrates a collection unit in the shape of back to back semi-circles, according to one embodiment of the invention.

To aid efficiency of energy harvesting the shape of the collection unit (in this case cylindrical) is influenced by the shape of the vortexes which as noted above is influenced by the shape of the first body impacting the flow. Another example of a shape of this collection unit may be two semi-circles placed back to back with a central core that allows for buoyancy, as shown in FIG. 9. As this turbulence is not always regular, horizontal or vertical fins may be added to the collection unit in an effort to capture additional directions of turbulent flow.

Existing energy harvesters have used these vortex phenomena to induce movement (known as vibration, galloping or fluttering). However, the motion of these prior units and their subsequent energy generation is from the object creating the vortexes. The current embodiment of this unit differs from the prior art as it is typically positioned behind an object creating the vortexes and is impacted by the changing direction of the fluid flow that is causing the vortexes.

This embodiment includes one stationary object impacting the flow of the fluid and a second unit that captures and converts the turbulence caused by that first object. That first object may be placed in the fluid as a part of this unit or may be an existing object in the fluid (e.g. pillar, post, leg of a bridge, or other stationary object). In the latter case the unit (transmission, generator and collection unit) would be positioned to capture and convert the existing turbulence.

C. Pendulum Bowl

FIGS. 7A and 7B are illustrations of a collection unit referred to by the inventor as a pendulum bowl. In one embodiment, the pendulum bowl is a weighted mass (3a) with an internal core (3B) that allows the articulating arm to attach and move closer or further away from the transmission. There is a space in the center of the bowl (3c) to allow clearance for the transmission. As this embodiment involves the unit being attached to the Prime Mover, it is the random back and forth (7B) or up and down (7A) movement of that Prime Mover that causes the relative motion between the weight (primarily influenced by gravity) and the unit (influenced by Prime Mover) that provides the kinetic forces that will be converted.

Some applications may include removing all or some of the enclosures and replacing this pendulum bowl with a weighted part of the Prime Mover in an effort to reduce overall weight and increase efficiency (one example might be to use the spare wheel or battery of a vehicle as the weighted mass).

D. Direct Attachment

FIG. 8 illustrates a direct attachment collection unit, where the articulating arm is attached between parts of a Prime Mover. For example, in one embodiment the unit is attached to the body of a vehicle (D1) and the articulating arm is attached directly to an axle (D2) similar to a shock absorber. The vibration from driving as well as the swinging of car axle will provide the kinetic force that is converted.

In an alternate embodiment, the articulating arm is connected between the transmission (e.g. connected to an engine, the prime mover) and a stationary object (the floor). As the engine runs it vibrates on the floor. This embodiment would dampen the vibration and convert the energy.

NOTE: The potential applications for this invention are not limited by size. They range from, very large ocean wave applications to very small (nano) applications in healthcare, robotics or many other fields.

VI. Transmission Unit

Figure 10A:
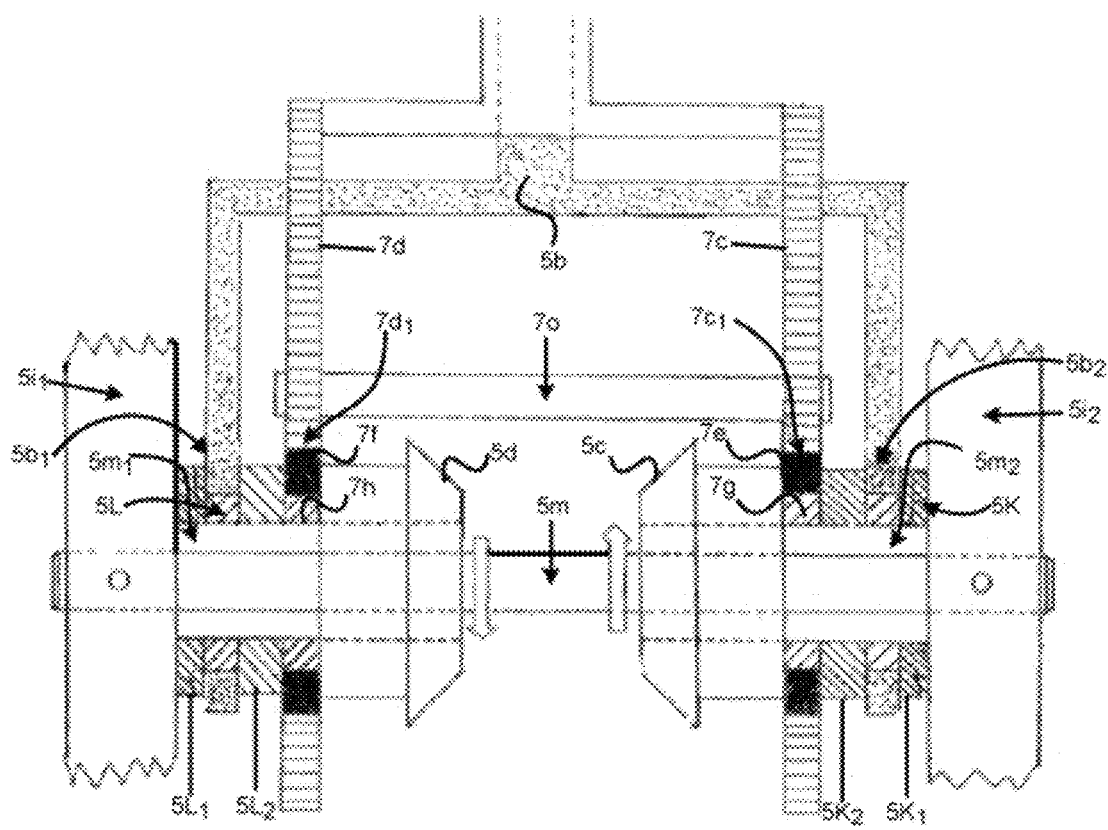
FIGS. 10A-10D illustrate one embodiment of a transmission unit which transfers multi-directional kinetic movement into directional movement for conversion into electricity, according to one embodiment of the invention.

The purpose of the transmission unit is to convert the random movement of an articulating arm (5a on FIG. 10A) into unidirectional rotation of an output shaft (5x on FIG. 10B), as illustrated in FIGS. 10A-10D. FIG. 10A is a drawing of the side view of the central input mechanism of the transmission element (E1) described in FIG. 10B.

FIG. 10A shows two U shaped brackets attaching to the transmission at one end and together forming the articulating arm (5a) at the other. The top of the first U shaped bracket (7a) is a sleeve (connected at the very top (5a1) to the collection unit) that can slide over the top of the second U shaped bracket (7b). Together the top of (7a) and 7(b) make up the articulating arm (5a). Sleeve (7a) slides over (7b) and is connected to two gear racks (7c) and (7d) that are guided by slide plate (7o). The gear racks (7c) and (7d) drive pinion gears (7e) and (7f) when the collection unit (and therefore sleeve (7a)) is moved up or down on this page (assume this is the z-axis). Pinion gears (7e) and (7f) each connect to one way bearings (7g) and (7h). These bearings are placed to face opposite directions, thereby allowing bearing (7g) to drive in the anticlockwise direction and freewheel in the clockwise direction (when viewed from the left side of the page) while bearing (7h) drives in the clockwise direction and can freewheel in the anticlockwise direction. Each of these bearings is seated on a sleeve (5m1) and (5m2) that can spin freely on shaft (5n) but is anchored individually to bevel gear (5c) and (5d).

The top of the second U shaped bracket (7b) ends inside the sleeve (7a) and together with slide plate (7o) act as a guide for gear racks (7c) and (7d). The bottom of this U-shaped bracket (7b) forms a second part of the yolk that connects at each end (5b1) and (5b2) to one way bearings (5k) and (5L). These bearings are also placed to face opposite directions to each other (and the same as (7g) and (7h)), thereby allowing bearing (5k) to drive in the anticlockwise direction and freewheel in the clockwise direction (same as one way bearing (7g)) while bearing (5L) drives in the clockwise direction and can freewheel in the anticlockwise direction (same as one way bearing (7h). Each of these bearings is seated on a sleeve (5m1) and (5m2) that can spin freely on shaft (5n). This shaft (5n) is connected solidly to the walls of the housing (5i1) and (5i2). The two ends of the yoke (5b1 & 5b2) as well as the one-way bearings (5k and 5L) are separated from the housing walls (5i1 & 5i2) by two thrust washers (5k1) and (5L1) They are also separated from pinion gear (7e) and (7f), the contact point of the racks (7d1) and (7c1) and bearings (7g) and (7h) by thrust washer (5k2) and (5L2). The sleeves (5m1) and (5m2) are solidly attached to bevel gears (5c) and (5d) such that when articulating arm (5a) moves back and forth orthogonal to shaft (5n) one way bearing (5k) will only drive when turned anticlockwise and will then rotate sleeve (5m1) and bevel gear (5c) anticlockwise. When articulating arm (5a) moves in the other direction and one way bearing (5k) is turned clockwise it will freewheel over sleeve (5m1). Similarly, when one way bearing (5L) is turned clockwise it will then rotate sleeve (5m2) and bevel gear (5d) clockwise otherwise will rotate freely over sleeve (5m2). Additionally and similarly, when the articulating arm moves up the page it will turn and drive one way bearing (7h) in the clockwise direction while bearing (7g) freewheels and when the arm moves down the page it will turn and drive one way bearing (7g) anticlockwise while one way bearing (7h) freewheels.

Note: In the event of simultaneous motion of the articulating arm, let's assume, in and left or out and left (or any combination of the 3 axes) the effect of drive on the sleeves is the same due to coordination of location and direction of the each of the one-way bearings. The fastest of the movements will drive the output shaft (5x—FIG. 5B).

Figure 10B:
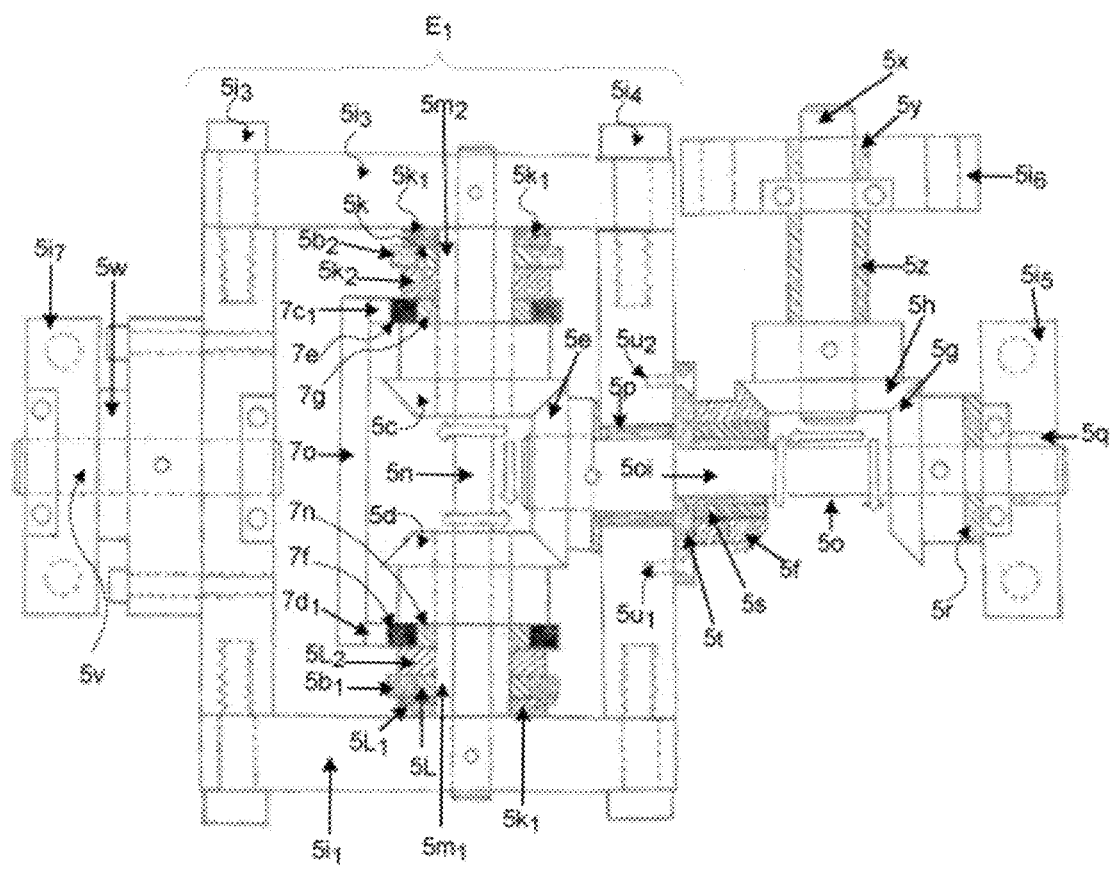
Figure 10C:
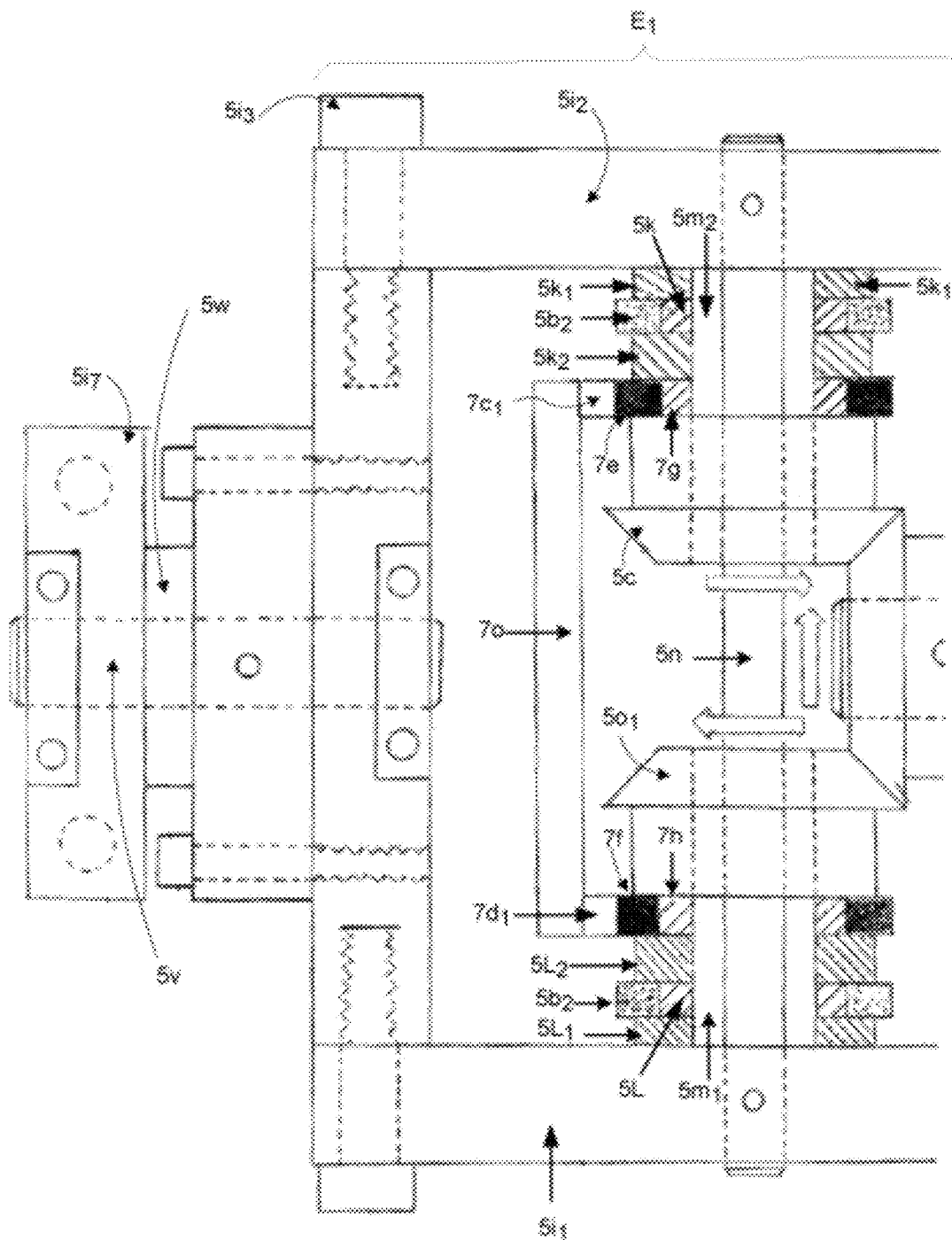
Figure 10D:
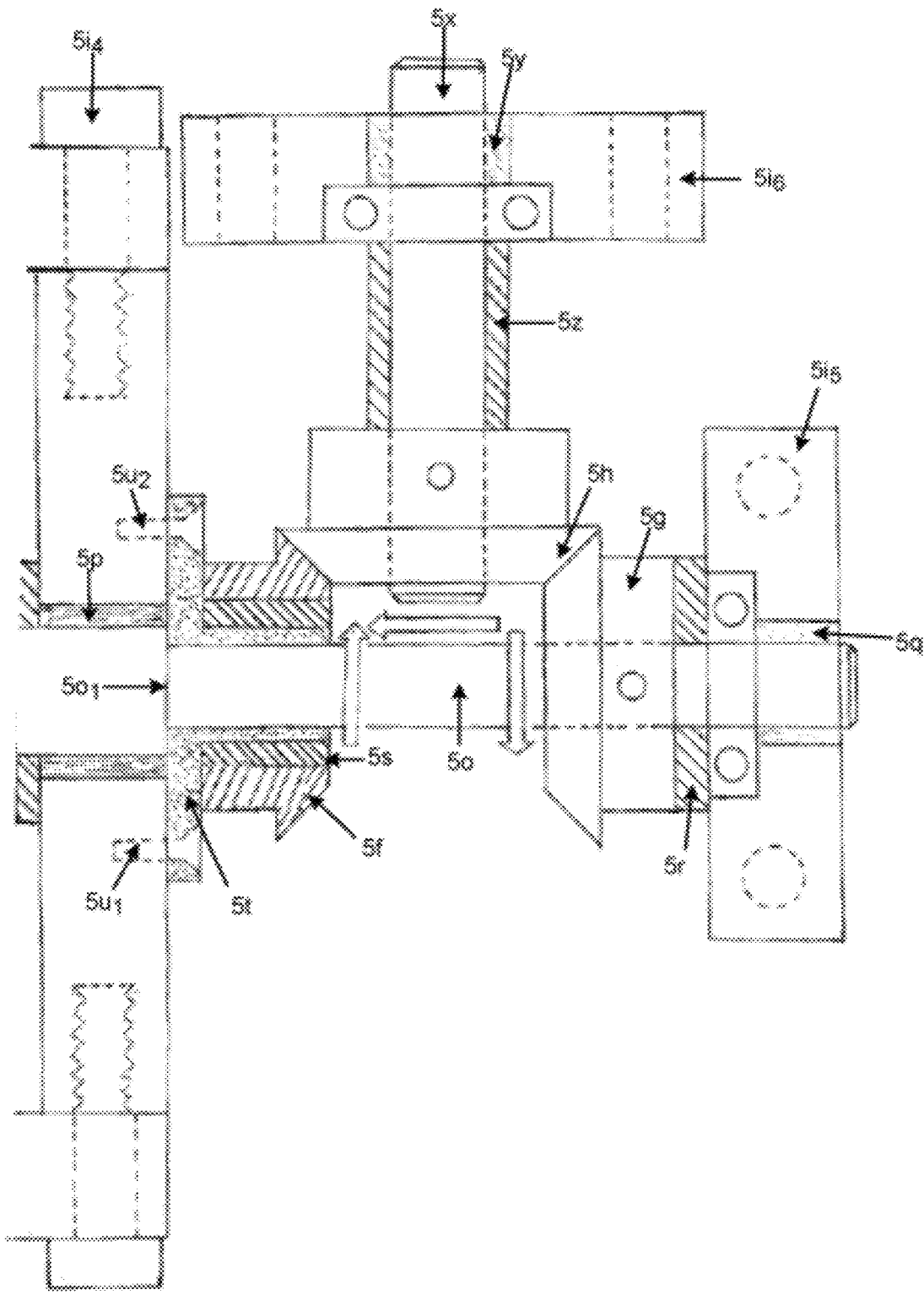

FIG. 10B depicts the transmission without the full articulating arms and yokes (5a, 5b, 7a, 7b—FIG. 5A). Only the ends of the yokes (5b1) and (5b2) and the contact points of racks (7c1) and (7d1) are depicted.

The transmission consists of a system of six bevel gears. These are all placed into a configuration of housing walls. Housing walls (5i1, 5i2, 5i3, 5i4) are all movable around a split shaft (5v) and (5o). Housing walls (5i5, 5i6, 5i7) are stationary and anchored to a solid base. This together creates part of an element (E1) that has the function of a gimbal. Bevel gears (5c and 5d) are connected orthogonally on either side of bevel gear (5e). Because the three gears are interconnected in this way, if bevel gear (5c) turns anticlockwise, bevel gear (5e) will turn clockwise, if viewed from the left side of the page, and bevel gear (5d) will also turn clockwise.

Bevel gear (5c) is driven anticlockwise by the articulating arm (5a—not shown in FIG. 10B) moving right to left across the page (assume this movement is on the x-axis) by engaging only one way bearing (5k) while one way bearing (5L) freewheels, it (bevel gear (5c)) will drive bevel gear (5e) clockwise which in turn will turn bevel gear (5d) clockwise which is consistent with one way bearing (5L)'s freewheel direction relative to the sleeve (5m1).

Bevel gear (5c) is also driven anticlockwise by the articulating arm (5a—not shown in Fig B) moving into the page (assume this movement is on the z axis) by rotating pinion gear (7e) anticlockwise and engaging only one way bearing (7g) while one way bearings (7h), (5k) and (5L) freewheel. This will drive bevel gear (5c) anticlockwise which in turn will also drive bevel gear (5e) clockwise.

Similarly, bevel gear (5d) is driven clockwise by the articulating arm (5a—not shown in FIG. 10B) moving left to right across the page (assume this movement is also on the x-axis) engaging only one way bearing (5L) while bearing (5k) freewheels, it (bevel gear (5(d)) will drive bevel gear (5e) in the same clockwise direction (as before) which in turn will turn bevel gear (5c) anticlockwise which is consistent with one way bearing (5k)'s freewheel direction relative to the sleeve (5m2).

Bevel gear (5d) is also driven clockwise by the articulating arm (5a—not shown in Fig B) moving out of the page (assume this movement is on the z axis) by rotating pinion gear (7f) clockwise and engaging only one way bearing (7h) while one way bearings (7g), (5k) and (5L) freewheel. This will drive bevel gear (5d) clockwise which in turn will also drive bevel gear (5e) clockwise.

Bevel gear (5e) is solidly attached to output shaft (5o) which in this embodiment is shown to reduce in diameter at (5o1) to illustrate flexibility with different size options. Bevel gear (5h) also has flexibility in size.

Therefore, the effect of moving the articulating arm left to right or right to left across the page on the x-axis or into or out of the page on the z-axis with this configuration will always drive bevel gear (5e) and output shaft (5o) in the clockwise direction.

It should be noted that shaft (5o) always drives in the clockwise direction and is free to continue to rotate in the clockwise direction if driven.

The second part of the gimbal movement is the motion of the articulating arm from top to bottom and bottom to top over the page (assume this is on the y-axis). This is achieved by pivoting movable housing walls (5i1, 5i2, 5i3 & 5i4) on two shafts, output shaft (5o) rotating in bearing (5q) located in stationary housing wall (5i5) and shaft (5v) rotating in bearing (5w) located in stationary housing wall (5i7).

Notice that shaft (5o) passes through movable housing wall (5i4) and is supported by bearing (5p).

Bevel gear (5g) attaches solidly to shaft (5o). Therefore, bevel gear (5g) is always driven in a clockwise direction (another preferred design option is to add a one way bearing between bevel gear (5g) and shaft (5o)). Bevel gear (5g) is separated from housing wall (5i5) by a thrust washer (5r).

Bevel gear (5f) is solidly attached to a one way bearing (5s) which is seated on a sleeve (5t) that is "T" shaped and attaches to the movable housing wall (5i4) via screws (5u1 and 5u2). This sleeve (5t) can spin freely over output shaft (5o). This arrangement allows bevel gear (5f) to be turned anticlockwise which is consistent with one way bearing (5s)'s freewheel direction relative to sleeve (5t) when driven by the clockwise drive of bevel gear (5g). Alternately, one way bearing (5s) will engage on sleeve (5t) to drive it and bevel gear (5f) anticlockwise if movable housing wall (5i4) is rotated anticlockwise. All of which drive bevel gear (5h) anticlockwise.

Bevel gears (5f) and (5g) connect orthogonally on either side of bevel gear (5h). Because the three gears are interconnected in this way and as bevel gear (5g) always turns clockwise, bevel gear (5f) will always turn anticlockwise and bevel gear (5h) which is solidly attached to output shaft (5x) will also always turn anticlockwise. Output shaft (5x) is supported by bearing (5y) located inside stationary housing wall (5i6). Bevel gear (5h) is separated from stationary housing wall (5i6) by thrust bushing (5z).

The clockwise drive of bevel gear (5g) and therefore the anticlockwise rotation of Bevel gear (5h) and output shaft (5x) is caused by five of the six motions of the articulating arm (5a—not shown in FIG. 5B) on its axes:
1) Left to right on the x-axis as detailed above,
2) Right to left on the x-axis as detailed above, or
3) Out to in on the z-axis as detailed above, or
4) In to out on the z-axis as detailed above, or
5) Top to bottom on the y-axis.

The top to bottom motion of the articulating arm rotates movable housing walls (5i1, 5i2, 5i3 & 5i4) clockwise. Bevel gears (5c) and (5d), and therefore bevel gear (5e), do not rotate relative to each other due to this motion. However, this set of bevel gears being rotated by the housing walls in this clockwise direction causes shaft (5o) to rotate clockwise relative to bevel gear bevel gear (5g) also driving it clockwise.

The sixth motion of the articulating arm (bottom to top on the y-axis) does not drive bevel gear (5g) clockwise, rather it drives bevel gear (5f) anticlockwise causing bevel gear (5g) to be driven clockwise—having the same effect of continuing to drive the output shaft (5x) anticlockwise. This motion (bottom to top on the y-axis) rotates movable housing walls (5i1, 5i2, 5i3 & 5i4) anticlockwise. This rotates sleeve (5t) anticlockwise engaging one way bearing (5s) and driving bevel gear (5f) anticlockwise. This anticlockwise sleeve rotation of (5t) causes bevel gears (5h) and output shaft (5x) to continue to rotate in the same anticlockwise direction. Bevel gear (5g) and shaft (5o) will be driven in the clockwise direction which is consistent with the description above.

The resulting transmission can convert inconsistent, erratic or random movement of the articulating arm in any direction: left to right or right to left on the x-axis; as well as, top to bottom or bottom to top on the y-axis; as well as in to out or out to in on the z-axis; or any combination of these angles of movement into unidirectional rotation of a drive shaft.

There are many potential uses for this device such as to spin a generator/alternator, flywheel, attach directly to a pump, or potentially many other uses.

Previous devices describe that various forms of random kinetic motion can be converted into electricity, and some also teach that it can be converted into unidirectional rotation of a drive shaft. However, the efficiency and versatility of the prior transmissions used to perform that function is improved upon by the current embodiments.

Figure 11A:
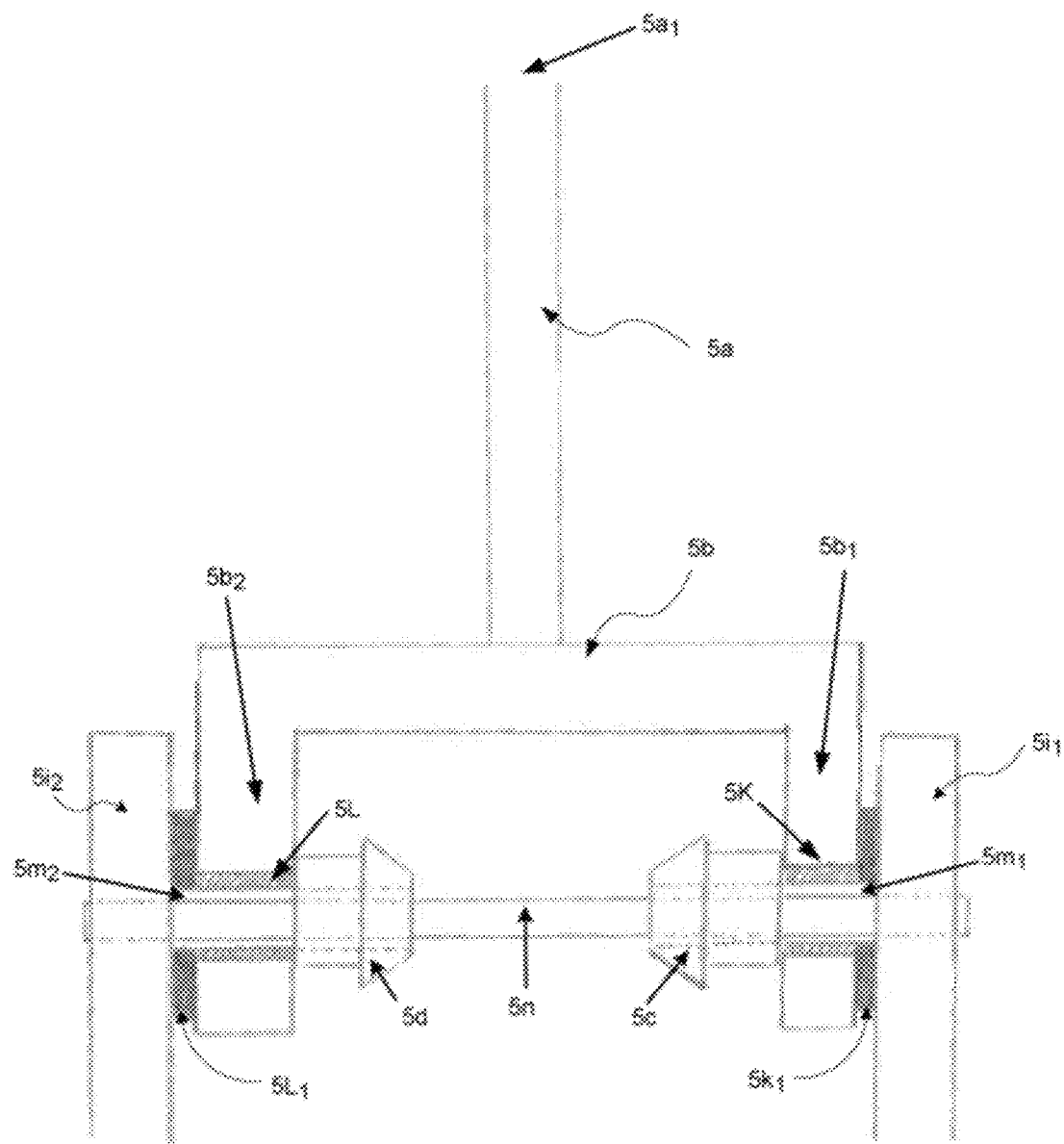
FIGS. 11A and 11B illustrate an alternative embodiment of the transmission, according to one embodiment of the invention.
Figure 11B:
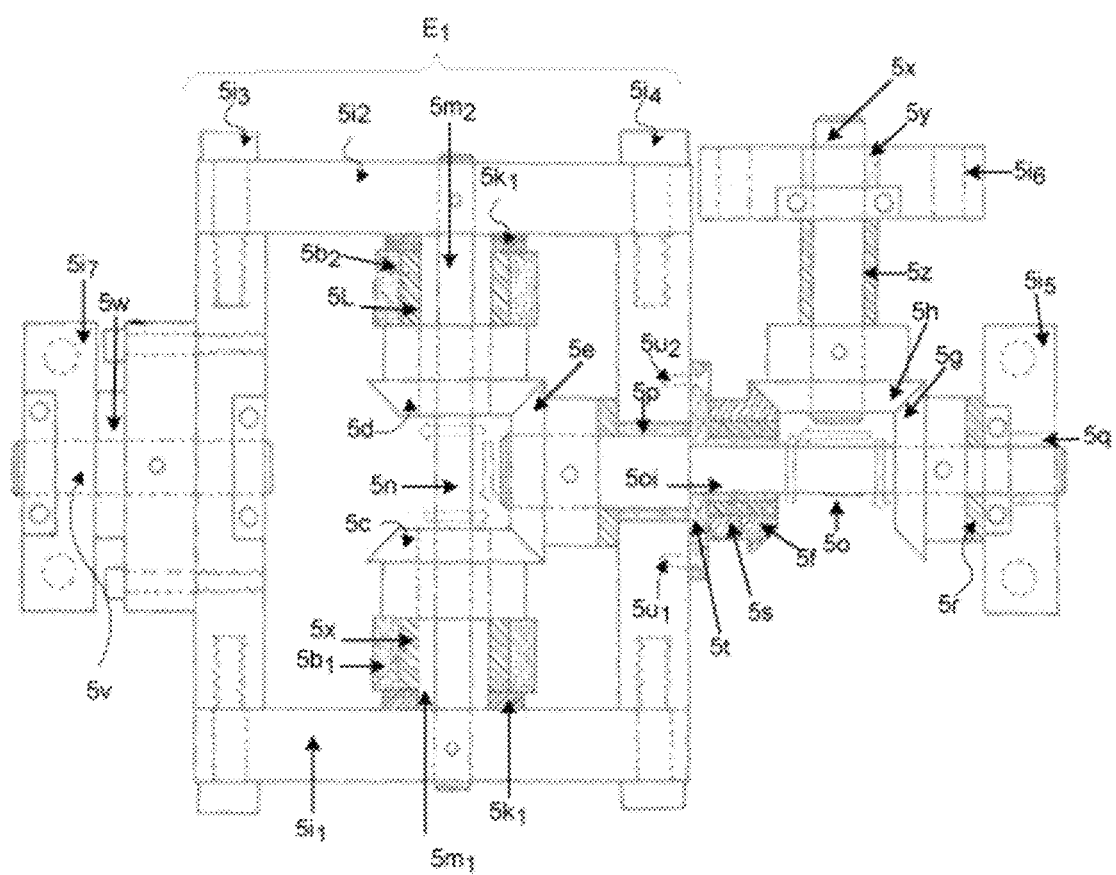

These improvements can be measured based on the following assumptions for proper and efficient functioning of a transmission:
1. This transmission works on three axes (X, Y and Z)
2. All else equal, the fewer gears used in a transmission the lower the internal friction and the simpler the design, build and maintenance of the unit leading to a lower cost of production and maintenance as well as a more efficient transmission.
3. The ability to scale the transmission without major design changes results in a more versatile transmission with lower overall production and maintenance costs.
4. If the same external force (A) is applied in each direction to the input (drive) shaft, the same torque (B) should be expected at the output shaft. (e.g. A force of "A" Newtons in the "Y" axis produces "B" rotations of the output shaft at "C" speed—If that same force was to act in the "X" axis it would be expected to produce the same result). This will result in an even distribution of power transfer and smooth operation of the transmission An alternative embodiment of the transmission unit which provides for movement in two axes is illustrated in FIG. 11A and FIG. 11B. FIG. 11A is a drawing of the central input mechanism of the transmission element (E1) described in FIG. 11B below. This includes an articulating arm (5a) which connects to one of the collection units at (5a1) on the one end and to the center of a U-shaped bracket (yoke) (5b) on the other end. This yoke then connects at each end (5b1) and (5b2) to one way bearings (5k) and (5L). These bearings are placed to face opposite directions, thereby allowing bearing (5k) to drive in the clockwise direction and freewheel in the anticlockwise direction while bearing (5L) drives in the anticlockwise direction and can freewheel in the clockwise direction. Each of these bearings is seated on a sleeve (5m1) and (5m2) that can spin freely on shaft (5n). This shaft (5n) is connected solidly to the walls of the housing (5i1) and (5i2). The ends of the two ends of the yoke (5b1 & 5b2) as well as the one-way bearings (5k and 5L) are separated from the housing walls (5i1 & 5i2) by two thrust washers (5k1) and (5L1). The sleeves (5m1) and (5m2) are solidly attached to bevel gears (5c) and (5d) such that when articulating arm (5a) moves back and forth orthogonal to shaft (5n) one way bearing (5k) will only drive when turned clockwise and will then rotate sleeve (5m1) and bevel gear (5c) clockwise. When articulating arm (5a) moves in the other direction and one way bearing (5k) is turned anticlockwise it will freewheel over sleeve (5m1). Similarly, when one way bearing (5L) is turned anticlockwise it will then rotate sleeve (5m2) and bevel gear (5d) anticlockwise otherwise will rotate freely over sleeve (5m2).

FIG. 11B depicts the transmission without the full articulating arm (5a—FIG. 11A) and the yoke (5b—FIG. 11a). Only the ends of the yoke (5b1) and (5b2) are depicted.

The transmission consists of a system of six bevel gears. These are all placed into a configuration of housing walls. Housing walls (5i1, 5i2, 5i3, 5i4) are all movable around a split shaft (5v) and (5o). Housing walls (5i5, 5i6, 5i7) are stationary and anchored to a solid base all creating part of an element (E1) that has the function of a gimbal. Bevel gears (5c and 5d) are connected orthogonally on either side of bevel gear (5e). Because the three gears are interconnected in this way, if bevel gear (5c) turns clockwise, bevel gear (5e) will turn clockwise and, if viewed from the left side of the page, bevel gear (5d) will turn anticlockwise.

Bevel gear (5c) is driven clockwise by the articulating arm (5a—not shown in FIG. 11B) moving left to right across the page (assume this left to right movement is on the x-axis) by engaging only one way bearing (5k) while bearing (5L) freewheels, it (bevel gear (5c)) will drive bevel gear (5e) clockwise which in turn will turn bevel gear (5d) anticlockwise which is consistent with one way bearing (5L)'s freewheel direction relative to the sleeve (5m2).

Similarly, bevel gear (5d) is driven anticlockwise by the articulating arm (5a—not shown in FIG. 11B) moving right to left across the page (assume this right to left movement is on the x-axis) engaging only one way bearing (5L) while bearing (5k) freewheels, it (bevel gear (5(d)) will drive bevel gear (5e) in the same clockwise direction (as before) which in turn will turn bevel gear (5c) clockwise which is consistent with one way bearing (5k)'s freewheel direction relative to the sleeve (5m1).

Bevel gear (5e) is solidly attached to output shaft (5o) which in this embodiment is shown to reduce in diameter at (5o1) to illustrate the different size gears of (5f and 5g) from (5c, 5d & 5e). Therefore, the effect of moving the articulating arm left to right or right to left across the page on the x-axis with this configuration will always drive output shaft (5o) in the clockwise direction.

It should be noted that shaft (5o) always drives in the clockwise direction and is free to continue to rotate in the clockwise direction if driven.

The second part of the gimbal movement is the motion of the articulating arm from top to bottom and bottom to top over the page (assume this is on the y-axis). This is achieved by pivoting movable housing walls (5i1, 5i2, 5i3 & 5i4) on two shafts, output shaft (5o) rotating in bearing (5q) located in stationary housing wall (5i5) and shaft (5v) rotating in bearing (5w) located in stationary housing wall (5i7).

Notice that shaft (5o) passes through movable housing wall (5i4) and is supported by bearing (5p).

Bevel gear (5g) attaches solidly to shaft (5o). Therefor bevel gear (5g) is always driven in a clockwise direction. Bevel gear (5g) is separated from housing wall (5i5) by a thrust washer (5r).

Bevel gear (5f) is solidly attached to a one way bearing (5s) which is seated on a sleeve (5t) that is "T" shaped and attaches to the movable housing wall (5i4) via screws (5u1 and 5u2). This sleeve (5t) can spin freely over output shaft (5o). This arrangement allows bevel gear (5f) to be turned anticlockwise which is consistent with one way bearing (5s)'s freewheel direction relative to sleeve (5t) when driven by the clockwise drive of bevel gear (5g). Alternatively, one way bearing (5s) will engage on sleeve (5t) to drive it and bevel gear (5f) anticlockwise if movable housing wall (5i4) is rotated anticlockwise.

Bevel gears (5f) and (5g) connect orthogonally on either side of bevel gear (5h). Because the three gears are interconnected in this way and as bevel gear (5g) always turns clockwise, bevel gear (5f) will always turn anticlockwise and bevel gear (5h) which is solidly attached to output shaft (5x) will always turn anticlockwise. Output shaft (5x) is supported by bearing (5y) located inside stationary housing wall (5i6). Bevel gear (5h) is separated from stationary housing wall (5i6) by trust bushing (5z).

The clockwise drive of bevel gear (5g) and therefore the anticlockwise rotation of Bevel gear (5h) and output shaft (5x) is caused by three of the four motions of the articulating arm (5a—not shown in FIG. 11B) on its axes:
1) Left to right on the x-axis as detailed above,
2) Right to left on the x-axis as detailed above, or
3) Top to bottom on the y-axis.

The top to bottom motion of the articulating arm rotates movable housing walls (5i1, 5i2, 5i3 & 5i4) clockwise. Bevel gears (5c) and (5d) and therefore bevel gear (5e) do not rotate relative to each other due to this motion. However, this set of bevel gears being rotated by the housing walls in this clockwise direction does cause shaft (5o) to rotate clockwise relative to bevel gear bevel gear (5g) driving it clockwise as well.

The fourth motion of the articulating arm (bottom to top on the y-axis) does not drive bevel gear (5g) clockwise rather it drives bevel gear (5f) anticlockwise causing bevel gear (5g) to be driven clockwise—having the same effect of continuing to drive the output shaft (5x) anticlockwise. This motion (bottom to top on the y-axis) rotates movable housing walls (5i1, 5i2, 5i3 & 5i4) anticlockwise. This rotates sleeve (5t) anticlockwise engaging one way bearing (5s) and driving bevel gear (5f) anticlockwise. This causes bevel gears (5h) and output shaft (5x) to continue to rotate in the same anticlockwise direction. Bevel gear (5g) and shaft (5o) will be driven in the clockwise direction which is consistent with the description above.

The resulting transmission can convert inconsistent, erratic or random movement of the articulating arm in any direction, left to right or right to left on the x-axis, as well as, top to bottom or bottom to top on the y-axis, or any combination of these angles of movement into unidirectional rotation of a drive shaft.

There are many potential uses for this device such as to spin a generator/alternator, flywheel, attach directly to a pump, or potentially many other uses.

Previous devices describe that various forms of random kinetic motion can be converted into electricity, and some also teach that it can be converted into unidirectional rotation of a drive shaft. However, the efficiency and versatility of the prior transmissions used to perform that function is improved upon by the current embodiments.

These improvements can be measured based on the following assumptions for proper and efficient functioning of a transmission:

1. All else equal, the fewer gears used in a transmission the lower the internal friction and the simpler the design, build and maintenance of the unit will be. This leads to lower cost of production and maintenance as well as a more efficient transmission.

2. The ability to scale the transmission without major design changes will lead to a more versatile transmission and lower overall production and maintenance costs.

3. If the same external force (A) is applied in each direction to the input (drive) shaft, the same torque (B) should be expected at the output shaft. (e.g. a force of "A" Newtons in the "Y" axis produces "B" rotations of the output shaft at "C" speed—If that same force was to act in the "X" axis it would be expected to produce the same result). This will result in an even distribution of power transfer and smooth operation of the transmission.

VII. Energy Generation

In one embodiment, the device drives an electric generator, but the captured movement could be used for many other applications that would be evident to those skilled in the art. For example, the movement could be used to directly pump a fluid, pressurize a container or other similar functions.

VIII. Pivoting Lever Arms

The aforementioned embodiments convert the linear movement of an actuating arm directly into rotation of a drive shaft. The number of drive shaft rotations (or portion thereof) is directly related to the angle of movement of the actuating arm as measured at the pivot point of rotation.

Each movement is limited to a portion of one rotation for each movement of the actuating arm. For example, if the actuating arm is pushed several meters in one direction but achieves only 100 degrees of rotation as measured at the pivot point, the attached drive shaft will only turn the same 100 degrees (or approximately 30% of one revolution).

To cause multiple rotations of a rotor in a generator, this partial rotation would need to be geared up (e.g. by utilizing a connected series of increasingly smaller diameter gears). Although this gearing is possible, it is not practical for large applications with large forces at work. The large amount of torque (rotational force) being placed on the drive shaft and associated bearings requires parts manufactured at great cost and weight to accommodate these forces. Therefore, simply scaling up the aforementioned transmissions to a large design is less practical.

Figure 12:
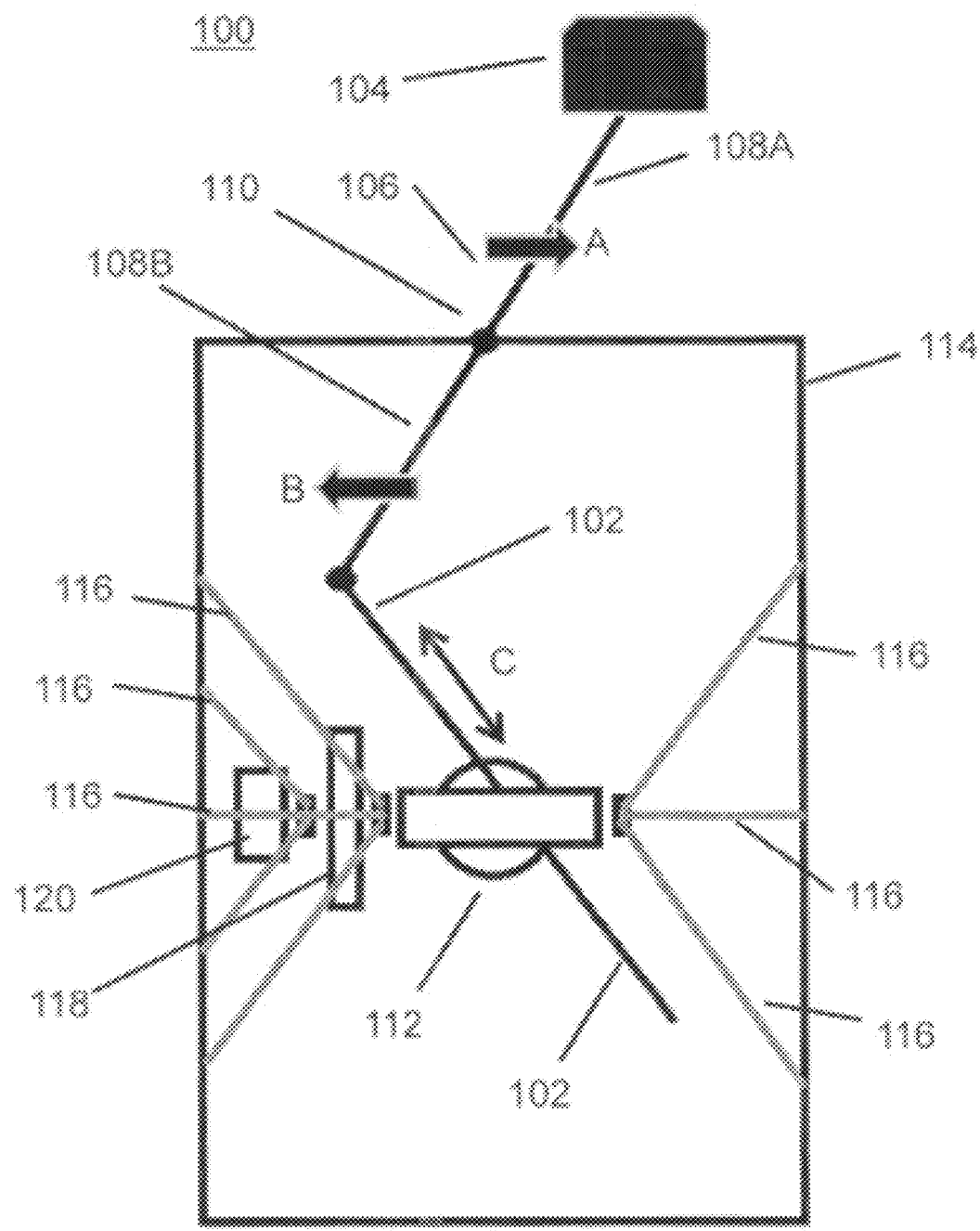
FIG. 12 illustrates one embodiment of a collection unit with a set of pivoting lever arms, according to one embodiment of the invention.

One potential solution for a large-scale actuation and transmission system is illustrated in the embodiment of the collection unit 100 in FIG. 12, where the actuating arm 102 is separated from the paddle 104 by lever arm 106. Lever arm 106 connects at one end to the paddle 104, pivots at point 110 and connects at the other end to actuating arm 102. Lever arm 106 is free to move along the X and Y axis as shown by arrow A. The portion of lever arm 106 below pivot point 110 that connects to actuating arm 112 is referred to as the inner lever arm and is label 108. As Lever arm 106 moves along the X or Y axis, the inner lever arm 108 also moves along the X and Y axis but in the opposite direction as shown by arrow B. The outer lever arm 106 connected to the paddle 104 is typically longer in length than the inner lever arm 108. The actuating arm 102 operates by moving in the direction of arrow C to interact directly with the transmission unit 112 which is free to rotate like a gimbal. The collection unit additionally includes a housing 114 along with structural supports 116 for the transmission unit 112 and connected flywheel 118, generator 120 and other gear components.

The primary design change in this embodiment is the moving of the pivot point of the original actuating arm (now the lever arm) above the transmission 112 to the housing 114. This creates an outer lever arm 106 and an inner lever arm (typically shorter than the outer lever arm) 108 below the pivot point 110. This configuration allows for the conversion of the large movement of the outer lever arm 106 above the pivot point 110 into a mirror image of that motion on the inner lever arm 108 with the same energy but contained in a more condensed area below the pivot point 110 (more condensed than the movement of lever arm 106 but less condensed than the previous embodiment which only allowed a percentage of one rotation of the drive shaft). The bottom of this short, inner lever arm 108 is attached to the top of the actuating arm 102 of the transmission 112. As the outer lever arm 106 moves in the x or y axis, it causes the in and out movement of the actuating arm 102 along the z-axis relative to the transmission 112. As the travel of this actuating arm 102 can be adjusted based on the length of the short lever arm 108 below the pivot point 110 and the transmission actuating arm 102, the rotation of the drive shaft is no longer directly related to the angle of movement of the actuating arm; rather, it is related to the distance of movement of these two shorter arms. This therefore increases the number of rotations of the drive shaft for every movement of the actuating arm when compared to previous embodiments and thereby reduces the initial torque on the drive shaft and components without significantly reducing energy transferred to the transmission.

Figure 13:
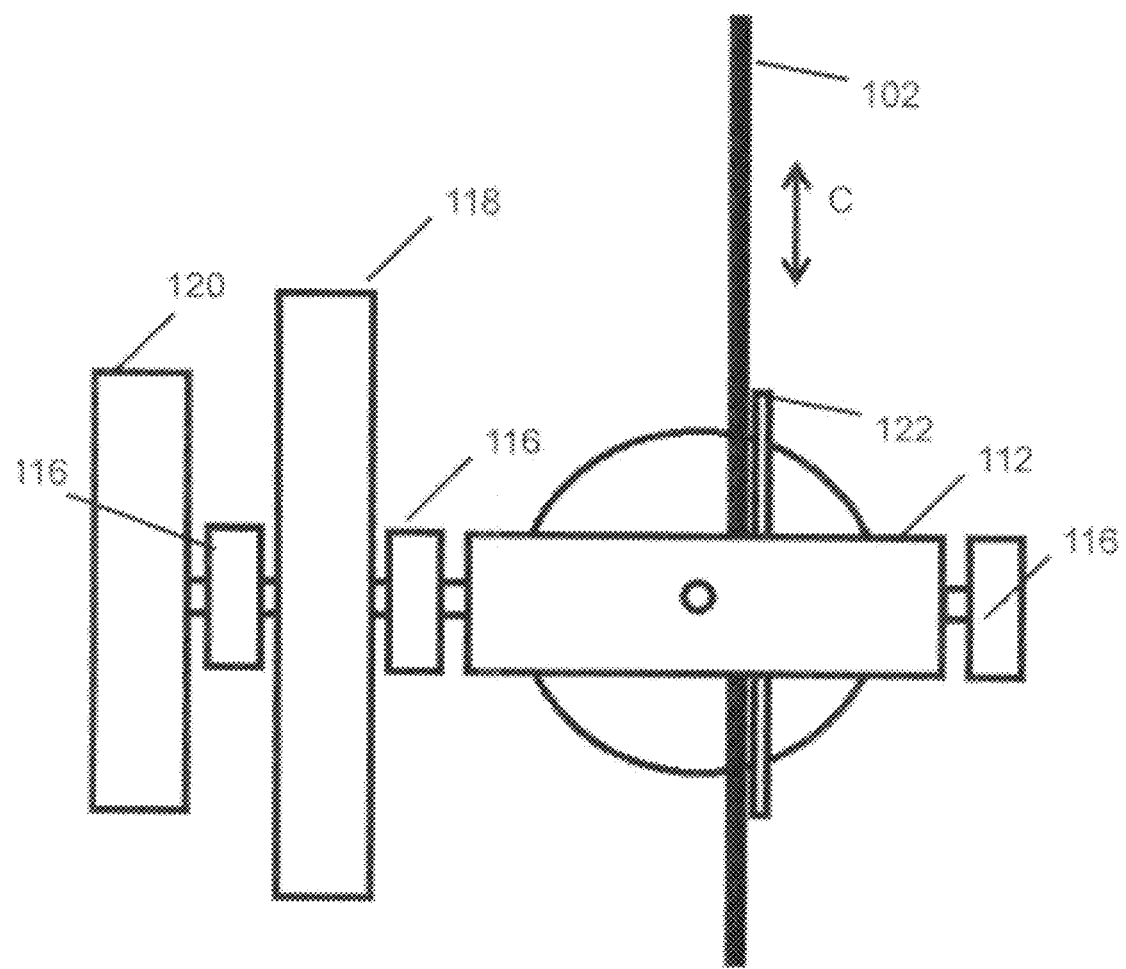
FIG. 13 illustrates one embodiment of a transmission system configured to operate with the set of pivoting lever arms, according to one embodiment of the invention.

FIG. 13 illustrates a larger view of this alternate embodiment of the transmission unit 112 configured to operate with the alternate pivoting lever arm configuration in FIG. 12. The central actuating arm 102 contacts the transmission unit 112, which then turns a series of gears to operate the flywheel 118 and ultimately the generator 120. A guide 122 is positioned alongside the actuating arm 102 to direct the actuating arm 102 into the transmission unit alongside the gears (see FIG. 14 and FIG. 15, below for more detailed illustrations of the guide 122 and the mechanism). This transmission unit 112 still transfers the z-axis motion of the actuating arm into unidirectional rotation, but it also allows freedom of movement in the x and y planes.

Figure 14:
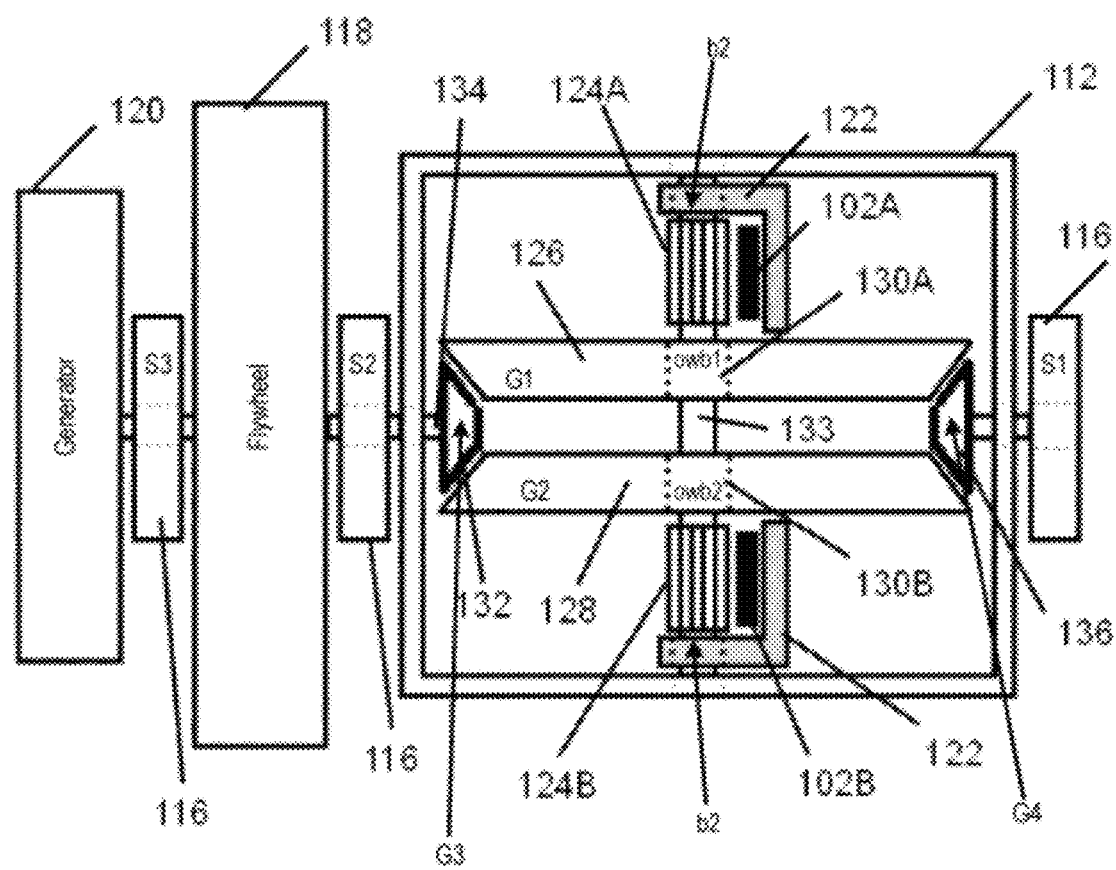
FIG. 14 illustrates a further embodiment of the transmission system configured to operate with the set of pivoting lever arms, according to one embodiment of the invention.

A more detailed illustration of the alternative transmission unit 112 is illustrated in FIG. 14, where in this example the actuation arm is divided into two parts, with a first actuating arm 102A and second actuating arm 102B operating to simultaneously interact with two pinion gears 124A and 124B. The guide 122 is positioned around each of the actuating arms 102A and 102B to mount the pinion gears and direct the actuating arms 102A and 102B against the pinion gears 124A and 124B to actuate the movement of the actuating arms 102A and 102B into rotational movement of the pinion gears 124A and 124B. The movement of the pinion gears 124A and 124B is then translated into movement of a first gear 126 and a second gear 128 through one way bearings 130A and 130B which are connected to the pinion gears via a primary shaft 133. It should be noted that one way bearings may be placed anywhere in the gear chain between pinion gear 124 and drive gear 132. The rotation of the first gear 126 and second gear 128 then operate on a third gear 132 which (just as illustrated in the prior embodiments) always rotates a drive shaft 134 in the same direction that then turns the flywheel 118 and ultimately the generator 120.

Also illustrated in FIG. 14, in one embodiment, an additional idler gear 136 may be added at an opposite end of the interaction between the first gear 126 and second gear 128 with the third gear 132. The idler gear 134 supports the transfer of force to the generator 120 and prevents the bending and flexing of the other gear and gear parts.

Also illustrated in FIG. 14, in one embodiment, an additional idler gear 136 may be added at an opposite end of the interaction between the first gear 126 and second gear 128 with the third gear 132. The idler gear 134 supports the transfer of force to the generator 120 and prevents the bending and flexing of the other gear and gear parts.

Figure 15:
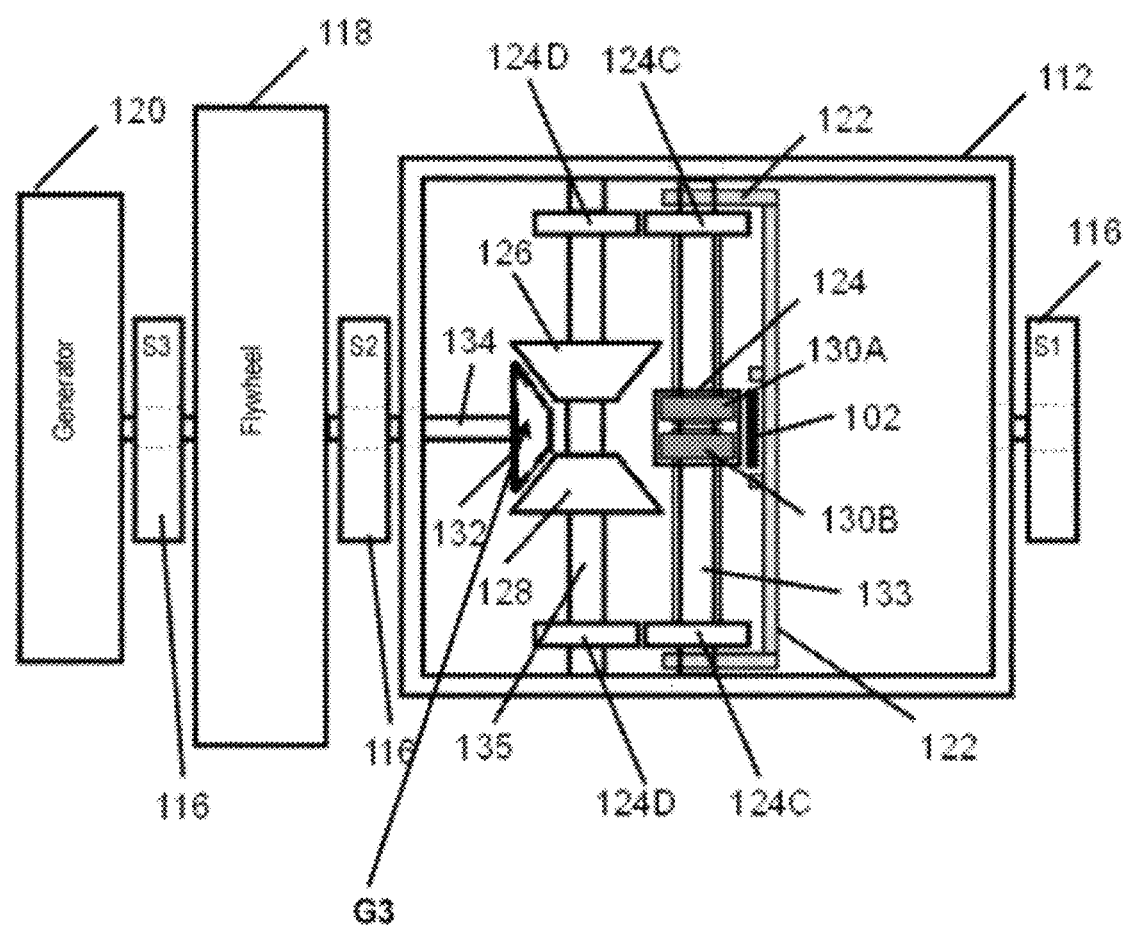
FIG. 15 illustrates yet another embodiment of the transmission system configured to operate with the set of pivoting lever arms, according to one embodiment of the invention.

An additional alternative embodiment of the transmission unit is further illustrated in FIG. 15, where a secondary shaft 135 is added adjacent to the primary shaft 133, where the primary shaft 133 still interfaces with the actuating arm 102 and a pinion gear 124 via one way bearings 130A and 130B, but where the resulting rotation of the primary shaft 133 is then translated to the secondary shaft 135 through connecting pinion gears 124C and 124D on adjacent sides of the transmission unit. The translated rotation of the secondary shaft 135 is then translated into rotation of the drive shaft 134 through the first gear 126 and the second gear 128 interfacing with the third gear 132. This alternative configuration allows for the reduction in the size of the gears. In a further embodiment, a single shaft and single articulating arm embodiment may be utilized where the single articulating arm as in FIG. 15 interfaces with a center portion of a single shaft between the first gear and second gear as in FIG. 14, allowing for a more compact design.

Figure 16:
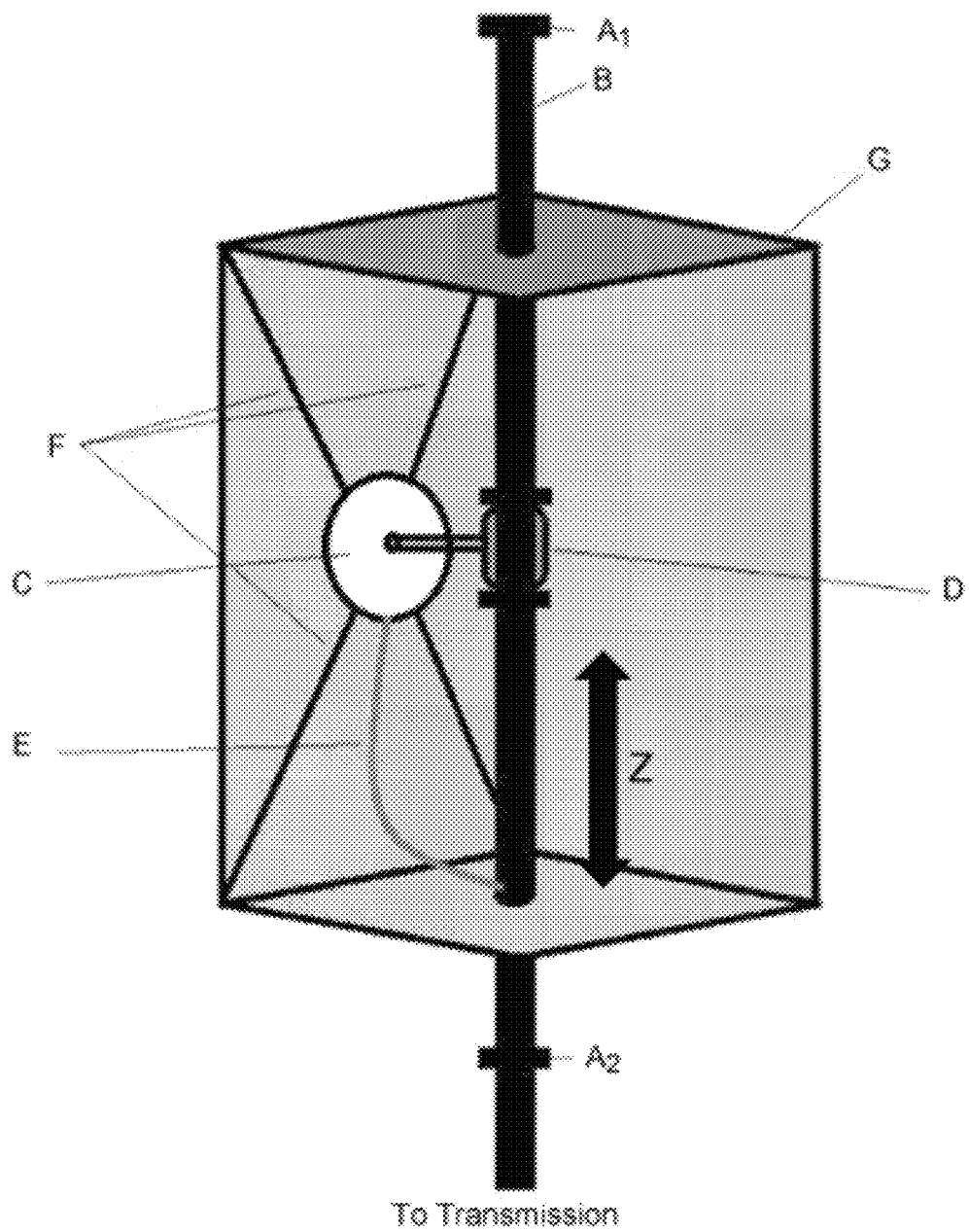
FIG. 16 illustrates one embodiment of a transmission unit configured to capture movement on a z-axis, according to one embodiment.

In a still further embodiment illustrated in FIG. 16, the unit may be configured to add motion in the Z-axis to the power generation ability of any of the designs. In this embodiment, the actuating arm B with a collection unit G moves with the prime mover (e.g. ocean waves). Collection unit G is able to slide up and down the actuating arm B in the direction of arrow Z between the stops with or without springs or similar at A1 and A2. This motion is in the Z-axis relative to the transmission unit which is located at the end of the actuating arm B. As collection unit G slides on actuating arm B (which may be threaded or toothed), the motion causes the rotation of worm gear D (in the case of threaded actuating arm B).

Worm gear D drives a series of other gears and bevel gears—similarly to those described in the transmission unit in Section VI above—to rotate a drive shaft of generator C in one direction. Generator C and the drive shaft are supported inside the collection unit with supports F. Power generated from generator C is then fed through cable E down the actuating shaft B where it becomes available for storage or transmission, as determined by the specific application of the device.

Figure 17:
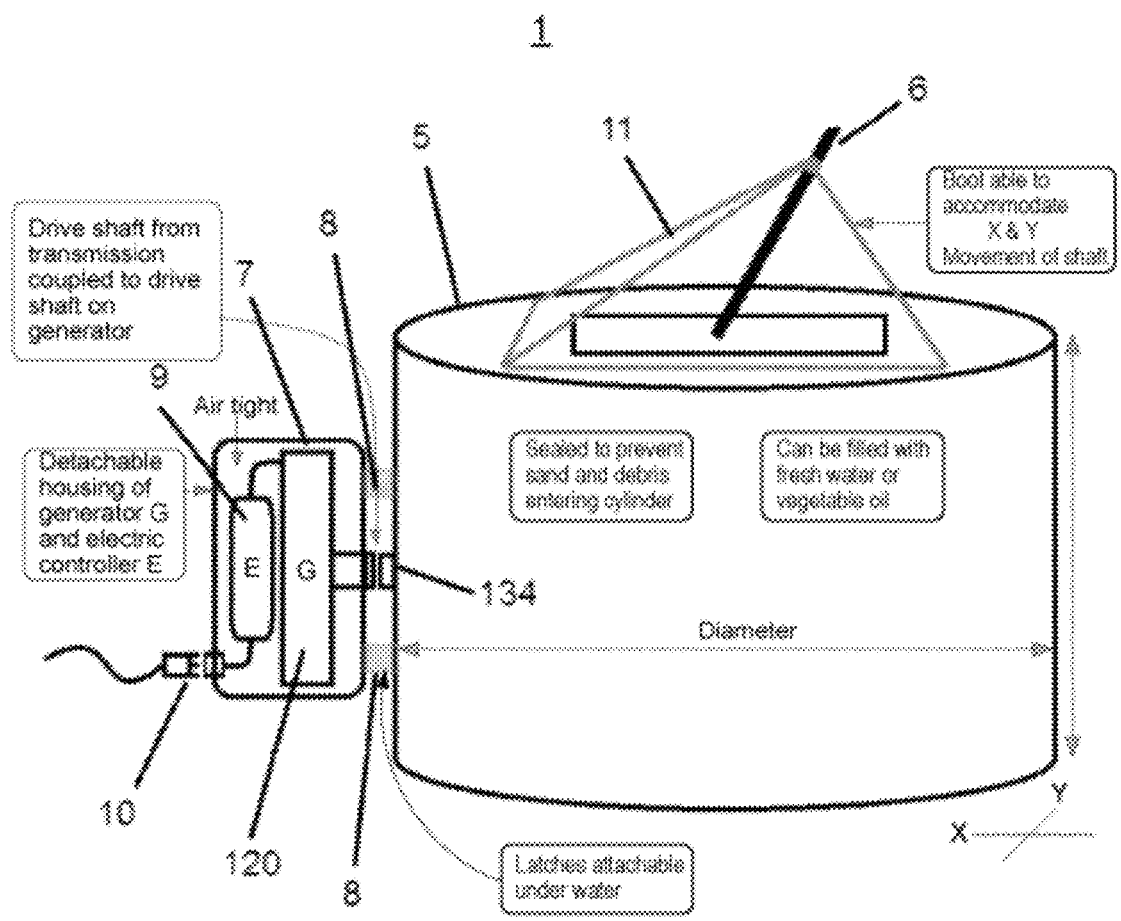
FIG. 17 illustrates one embodiment of a transmission and collection unit capable of collecting kinetic movement and transforming it into electricity, according to one embodiment of the invention.

Finally, FIG. 17 illustrates one embodiment of the overall device 1 with the transmission unit 5 connected with the articulating arm 6 and a power generation unit 7 positioned adjacent to the transmission unit and connected with the transmission unit through the drive shaft 134 (solid or magnetic coupling may be used). In this embodiment, the power generation unit 7 may be secured to the transmission unit 3 via one or more latches 8. The power generation unit 7 includes the generator 120 which is in geared connection with the drive shaft 134 and which generates an electrical charge that is then transmitted to an electrical controller 9, which regulates the electricity that is then transmitted through a power cable 10 to an external source.

The embodiment in FIG. 17 also illustrates a boot 11 which provides structural support to the articulating arm 6 via the housing of the transmission unit 3, while still allowing the articulating arm 6 to move in multiple directions. Furthermore, the transmission unit 5 may be sealed to prevent debris, liquid or other particulates from entering the chamber and damaging or wearing on the gears and other mechanisms, and in one embodiment may be filled with water or an oil such as vegetable oil or mineral oil. In an underwater application, filling the transmission unit with a mineral oil with a weight heavier than water will allow the mineral oil to remain within the chamber of the transmission unit and remain within the portion of the chamber involving the moving components even if water leakage occurs.

IX. Wave Energy Conversion Device

In one embodiment, an underwater device may be specifically configured for use in wave energy conversion. A wave energy conversion device could be mounted to the sea floor or floated at the surface to capture wave energy and convert periodic waveforms into consistent electricity. Existing wave energy conversion devices primarily capture motion across only one axis and usually utilize hydraulic systems and an accumulator to generate consistent electric power. These systems are typically expensive to build and maintain. In contrast, the embodiments of the wave energy conversion device described herein provide for simple, low cost, durable, self-contained electrical generation devices which can be placed underwater and near-shore to provide clean energy without the use of hydraulics. Furthermore, the wave energy conversion device described herein is configured with either 1, 2 or 3 planar axes of motion capture and may have an electronic accumulator which is designed to produce consistent voltage.

Figure 18A:
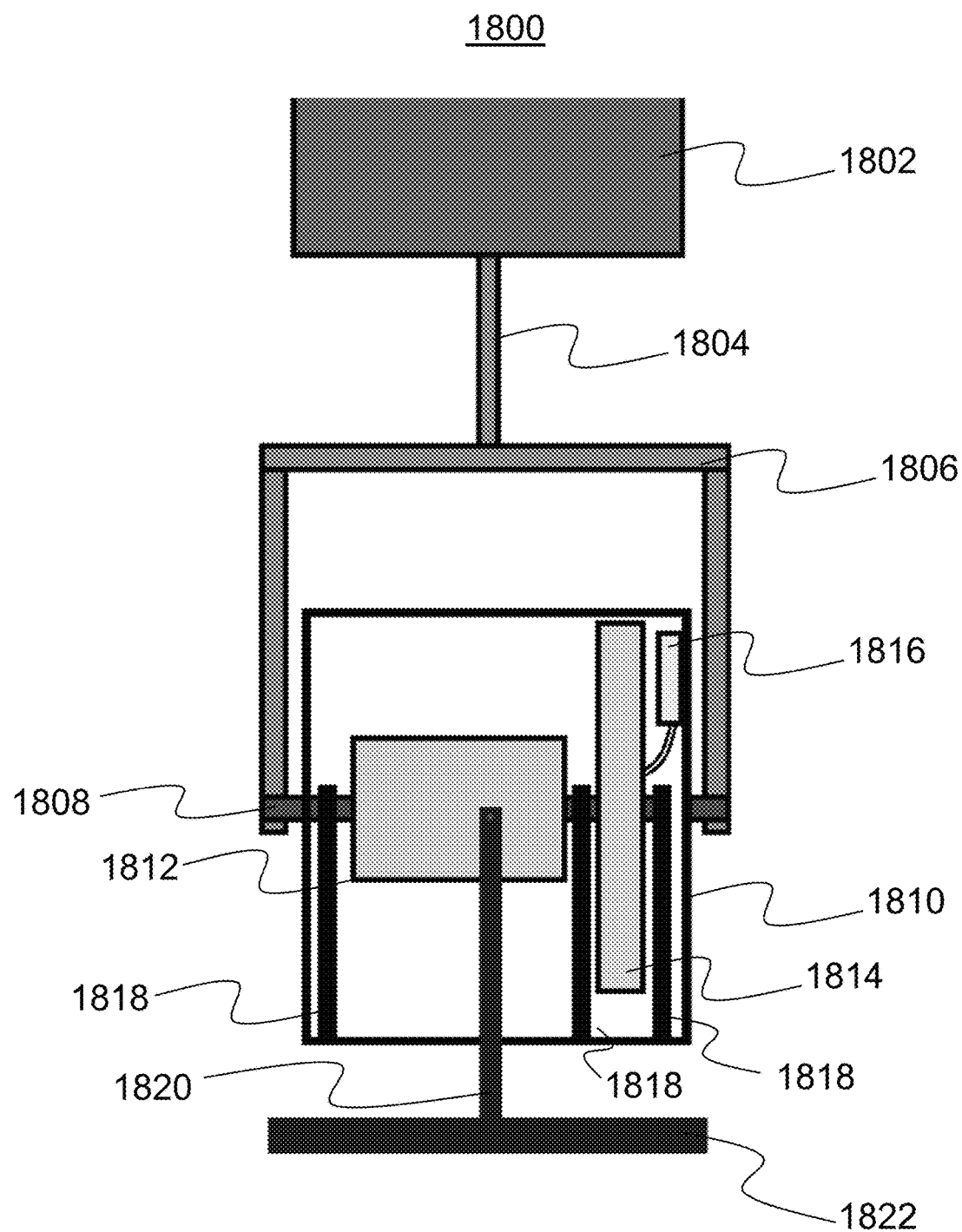
FIG. 18A illustrates a front view of a single-direction wave power conversion device, according to one embodiment of the invention.

A first embodiment of a wave energy conversion device 1800 is illustrated in a front orthogonal view in FIG. 18A, where a collection unit 1802 is configured to interface with wave energy motion to convert omnidirectional movement of wave motion into pivoting movement of an actuating arm 1804 attached to the collection unit 1802. As has been described in earlier sections of the application, the collection unit 1802 may take many shapes and sizes, such as a simple, flat paddle shape or the complex, angular tesseract shown in FIG. 3. This actuating arm 1804 may be connected on an opposing end to a yolk 1806, which translates the pivoting movement into rotational movement of a first drive shaft 1808. In an alternate embodiment, the yolk 1806 may be directly connected on opposing side of the collection unit 1802 instead of through the yolk 1806. The drive shaft 1808 may be connected with at least one end of the yolk 1806 external to a transmission unit 1810, such that the drive shaft 1808 generally transverses the interior of the transmission unit 1810. The transmission unit 1810 may generally be a watertight housing surrounding the electrical generation components, and may take a rectangular, cylindrical, spherical or other relevant shape. In one embodiment, the transmission unit 1810 may be filled with a fluid such as oil, water or silicone, or be filled with a gas or pressurized air in order to provide an environment conducive to the efficient operation of the device. Within the watertight transmission unit 1810, the rotational movement of the drive shaft 1808 is converted by a gearbox 1812 and connected first generator 1814 into electrical power. In one embodiment, an electrical control module 1816 is provided to monitor and regulate the voltage being generated by the transmission unit 1810 to ensure that it provides consistent power at required voltage parameters. Internal support arms 1818 may be positioned throughout the transmission unit to mount the various components within the transmission unit. In this embodiment, external support arms 1820 provide support for the transmission unit 1810 using a base or stand 1822 which may be attached to the sea floor. The transmission unit 1810 may also include a pressure regulator to allow for regulation of pressure within the housing.

Figure 18B:
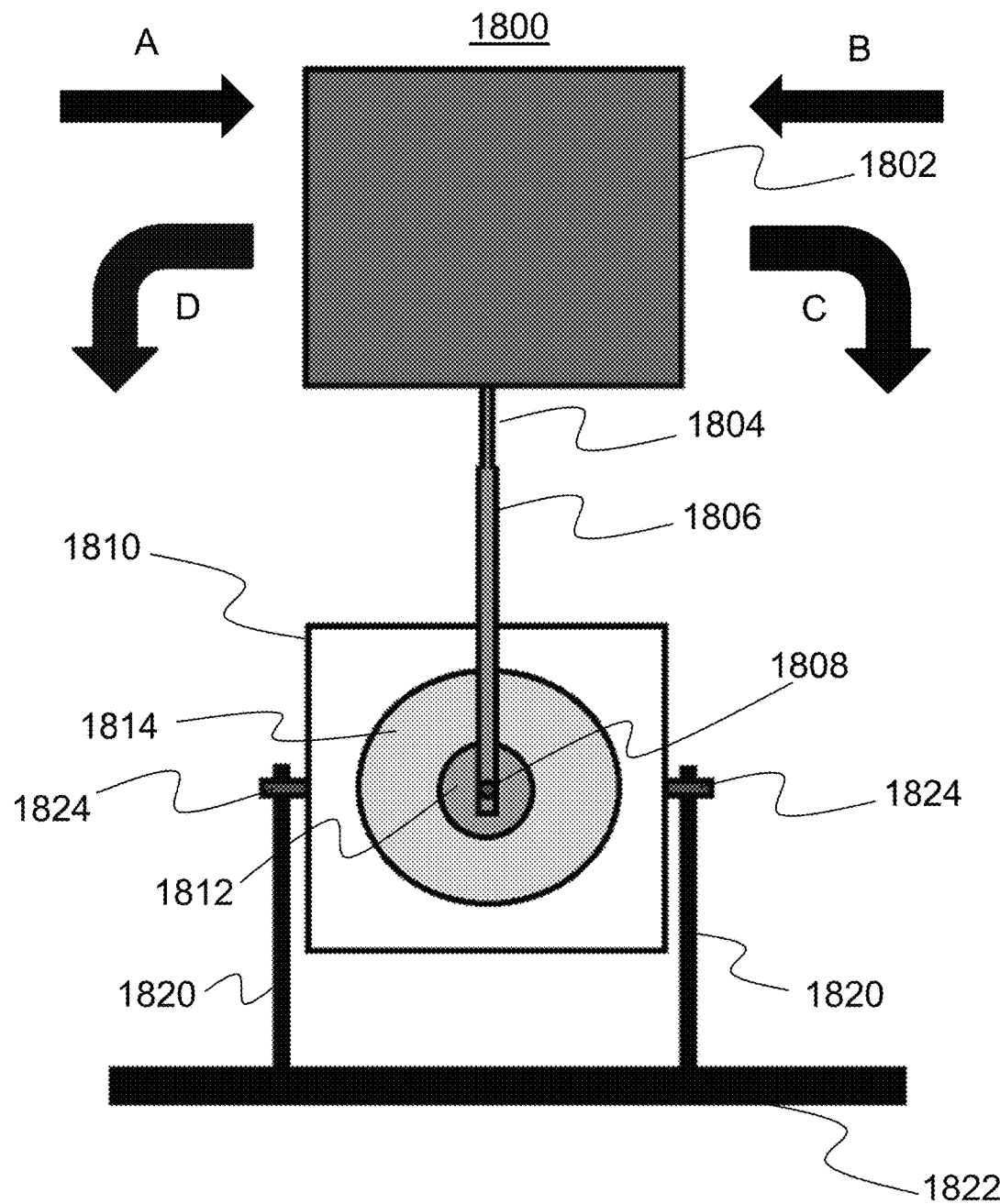
FIG. 18B illustrates a side view of the single-direction wave power conversion device, according to one embodiment of the invention.

FIG. 18B illustrates a side orthogonal view of the wave power conversion device 1800 which more clearly illustrates the rotational connection between the yolk 1806 and drive shaft 1808 along a first directional axis (shown by the illustrated directional arrows). FIG. 18B also illustrates the rotational connection between the fixed external support arms 1820 and the transmission unit 1810 via pivoting support arm brackets 1824 extending outward from opposing sides of the transmission unit 1810. The pivoting support arm brackets 1824 allow for movement of the device along a second directional axis generally perpendicular to the first directional axis (shown by the directional arrows in FIG. 18D, below). The movement of the device along both the first directional axis and the second directional axis allows the device to absorb omnidirectional wave movement to prevent excess stress on the overall device. However, as shown in FIGS. 18C and 18D, the device may also be configured to generate electricity through the movement of the device along the second axis of movement in addition to the first axis of movement, the combination of movement between the two axes allowing the device 1800 to pivot along any compound angle between the two axes.

As illustrated in FIG. 18B, the collection unit 1802 may be disposed generally perpendicular to the primary direction of wave movement along the first axis of movement so that it will capture both an advancing wave motion (Arrow A) and a returning wave motion (Arrow B) in the opposite direction. An advancing wave would cause movement of the collection unit 1802 along an arc following Arrow C, while a returning wave would cause movement of the collection unit 1802 along an arc following Arrow D. In one embodiment, the collection unit 1802 may rotate at least 90 degrees (in either direction) along the first axis of movement from its illustrated top-most position to a lowermost point where it is approximately level with the transmission unit 1810. This degree of rotation may be provided as part of the intended operation of the device during energy conversion so that as much of the movement of a wave can be converted into rotational motion via the large swings in the collection unit 1802. As will be described further below, the collection unit 1802 is also capable of rotating at least 90 degrees in either direction along the second axis of movement via the pivoting support arm brackets 1824, such that the entire collection unit 1802 and transmission unit 1810 jointly rotate in any compound angle between the two planar axes.

In one embodiment, the collection unit 1802 may be configured to rotate to the lowermost point where the wave movement would have minimal impact on the collection unit 1802. This configuration may be designed to effectively "decouple" the device 1800 from a powerful wave to prevent excess stress on the collection unit 1802 and other components of the device, or to prevent excess power generation that may occur from excessive rotation.

Figure 18C:
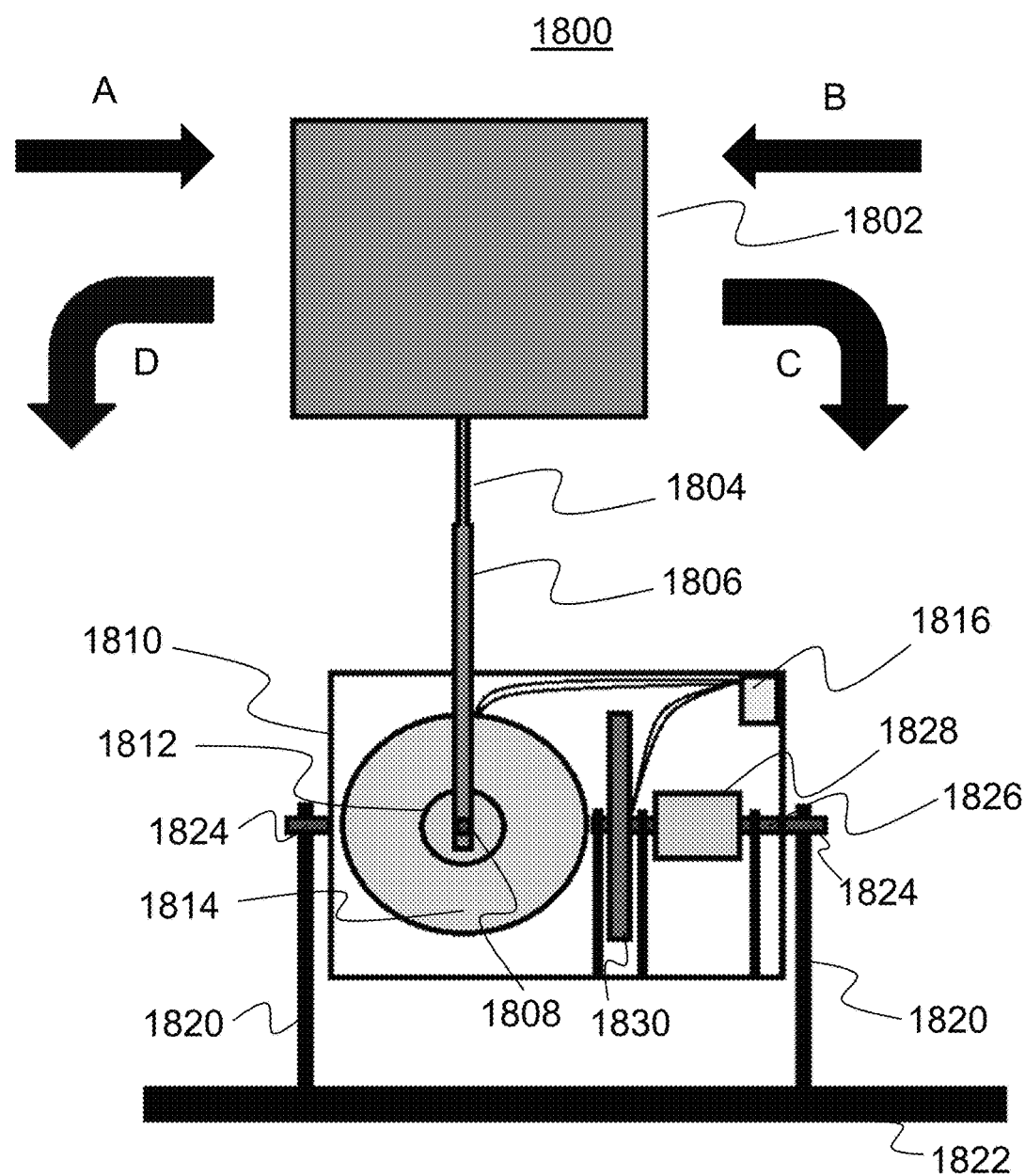
FIG. 18C illustrates a side view of a dual-direction wave power conversion device, according to one embodiment of the invention.
Figure 18D:
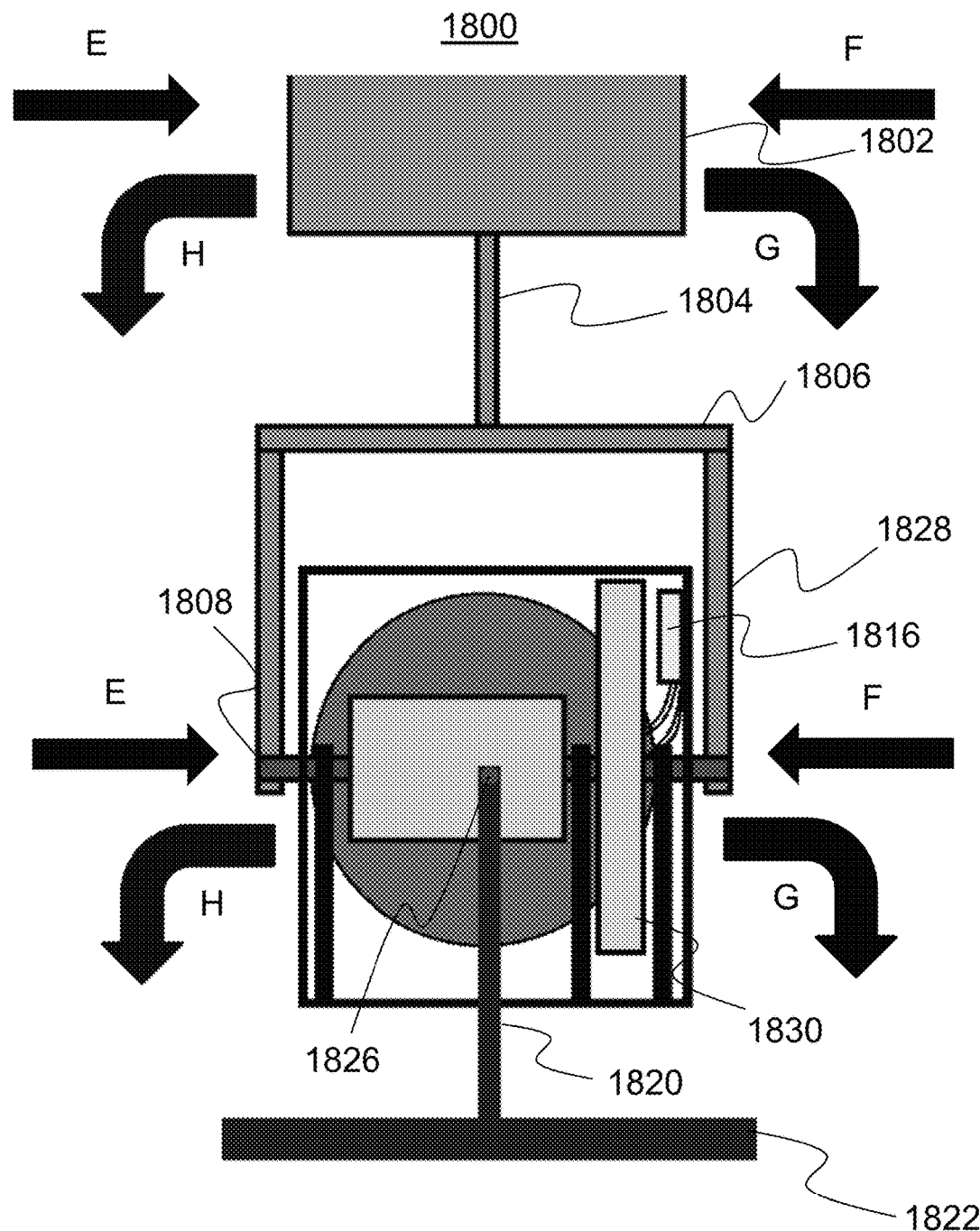
FIG. 18D illustrates a front view of the dual-direction wave power conversion device, according to one embodiment of the invention.

In an alternative embodiment of the wave power conversion device illustrated in a side orthogonal view in FIG. 18C, the device 1800 may be configured for dual-axis power conversion by converting the pivoting movement of the collection unit 1802 and transmission unit 1810 along the second axis of movement via the pivoting support arm brackets 1824 into rotational movement of a second drive shaft 1826. This configuration will therefore allow energy capture from movement of the collection unit 1802 in any combination of angles along the first and/or second directional axes. In one embodiment, the pivoting support arm brackets 1824 may be rocker brackets supporting the second drive shaft 1826 in pivoting connection with the external support arms 1820. As with the first drive shaft 1808, the second drive shaft 1826 may generally traverse the interior of the transmission unit 1810 in a perpendicular direction from the first drive shaft 1808. The second drive shaft 1826 rotates in response to the pivoting movement of the transmission unit 1810 and collection unit 1802 along the second axis of movement, providing additional pivoting movement of the entire transmission unit 1810 in a perpendicular direction to the first direction of rotation of the collection unit 1802, as shown by the arrows in FIG. 18D. A second gear box 1828 and second generator 1830 are provided to convert this second axis of rotational movement into electrical energy. FIG. 18D is a front orthogonal view of the dual-axis wave power conversion device viewed along the axis of the second drive shaft 1826 which more clearly shows the arrangement of the second drive shaft 1826 and the perpendicular configuration of the first drive shaft 1808. In this embodiment, the collection unit 1802 and transmission unit 1810 may be positioned generally perpendicular to the secondary direction of wave movement (along the second axis of movement) so that it will capture a first side wave motion (Arrow E) and a second side wave motion (Arrow F) in the opposite direction. A first side wave motion would cause movement of the transmission unit 1810 and collection unit 1802 along an arc following Arrow G, while a second side wave motion would cause movement of the transmission unit 1810 and collection unit 1802 along an arc following Arrow H. It is contemplated that in one embodiment, a system of gearing as described in the above sections and illustrated in FIGS. 10A-11 could be utilized to translate rotation of one, two or three drive shafts into unidirectional rotation of a single drive shaft and eliminate the need for multiple electrical generators.

In a further embodiment, motion along a third directional axis may be captured in addition to the two already described herein. This third axis of movement may be incorporated in terms of the movement of the collection unit 1802 with respect to the transmission unit 1810 along a z-axis, i.e. the change in distance of the collection unit 1802 from the transmission unit 1810 along the length of the actuating arm 1804. The ability to capture this third axis of movement has been previously described above with respect to FIG. 16, but it is important to note that it could be captured via a drive shaft and related components embedded within the collection unit 1802 or the transmission unit 1810.

In one embodiment, an array of devices may be positioned on or near the sea floor to provide combined power generation for large-scale electrical demand applications. One example configuration may provide an array of devices positioned sequentially along a wave break so that as a wave moves toward the shore, it will continuously impact a sequence of devices that can then each provide a consistent amount of electricity over the period of time that the wave moves across the array. This or other unique configurations may be utilized for large-scale applications that require a connection to an electrical grid or that require a continuous, consistent amount of electricity to be produced.

As mentioned above, each embodiment may include an electronics control module 1816 which serves to monitor and regulate the electricity being generated by the wave power conversion device. More specifically, the electronics control module 1816 may control the voltage output to an internal or external battery to provide a specific voltage range needed to charge a battery of a specific voltage. If the voltage generated by the device exceeds the maximum voltage range, the control module may limit the power transmission to the battery so the proper voltage range is achieved.

Power generated by the device may be stored internally (such as within a battery) or transmitted to an external battery or device for further storage or use of the generated electricity. In one embodiment, a series of wave power conversion devices may be placed in stepped positions so that each device generates power from a passing wave in a staggered sequence in order to provide a larger and more continuous stream of power.

In another embodiment, the electronics control module may also monitor the power delivered by one or more generators—either to an endpoint load or to some point in the power conversion ahead of that load—and make real-time adjustments of the current drawn from the generator(s) in order to maintain maximum or near maximum power delivered from the generator(s). In some systems, it may be sufficient to simply match the load resistance seen by the generator(s) (i.e. the ratio of the generator voltage to the current drawn from the generator) to the generator's internal resistance to achieve optimal load power transfer. In these simpler systems, the load resistance could be manually adjustable (via a potentiometer for instance) to allow tailoring the electronics for different mechanical systems. In some systems, a lighter effective load resistance may be advantageous to minimize mechanical stresses on the system. However, more complex systems may require a dynamic algorithm (such as a perturb and observe method) to perform maximum power point tracking. Since there will likely be a DC-DC switching regulator converting fluctuating generator voltage to more stable system voltage, a novel cycle-bycycle approach could be used to adjust the converter switch duty cycle in real time without requiring a perturbation step. A maximum power transfer algorithm could also take into account system states such as paddle angle and/or environmental conditions such as wave/current speed to help optimize other aspects of the system such as maximizing coupling of the paddle to the available current. One advantage of the electronics control module is the ability to capture even low energy wave movement, as well as to cut power if a large wave generates too much power.

The information generated by the electronics control module in the device may be utilized within the device to alter the performance and other behaviors, but may also be transmitted outside of the device to monitoring equipment or other data collection devices for additional adjustments or future analytics. In one embodiment, the data may be transmitted along with the generated electricity to a device or machine using the electricity which may have better capabilities to transmit the data to another external device for collecting and analyzing the data. In another embodiment, the data may be accessed via a data collection unit positioned within or even on the outside of the device for direct access—such as through a wet-sealable plug or wireless connection—so that the data collection device can be detached and brought to the surface to collect the data or perform maintenance on the unit.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. An apparatus for converting wave movement in a body of water to electrical power, comprising:
    a collection unit configured to capture randomized kinetic energy from a wave;
    an actuating arm connected with the collection unit to translate the randomized kinetic energy into pivoting directional movement in at least two directional axes;
    a first drive shaft in rotating connection with the actuating arm via a yolk to translate the pivoting bidirectional movement of the actuating arm along a first directional axis into bidirectional torque of the first drive shaft;
    a transmission unit sealably enclosing a substantial portion of the first drive shaft;
    an electrical generation unit enclosed within the transmission unit and in geared connection with the first drive shaft to generate an electrical charge from the bidirectional torque; and
    at least one external support arm in rotating connection with the transmission unit at a connection point, wherein the at least one external support arm anchors the transmission unit in the body of water, wherein the external support arm allows for pivoting bidirectional movement of the transmission unit about the connection point along a second directional axis generally perpendicular to the first directional axis.

2. The apparatus of claim 1, further comprising a second drive shaft in rotating connection with the connection point between the at least one external support arm and the transmission unit to translate the pivoting bidirectional movement of the transmission unit along the second directional axis into torque of the second drive shaft, wherein the second drive shaft is in geared connection with a second electrical generation unit enclosed within the transmission unit to generate an electrical charge from the torque.

3. The apparatus of claim 1, wherein the collection unit is a paddle-shape.

4. The apparatus of claim 1, wherein the collection unit is a tesseract.

5. The apparatus of claim 1, wherein the collection unit rotates along the first directional axis up to approximately 90 degrees in either direction from a topmost position disposed above the transmission unit.

6. The apparatus of claim 5, wherein the collection unit rotates the transmission unit along the second directional axis up to approximately 90 degrees in either direction from the topmost position.

7. The apparatus of claim 6, wherein the collection unit rotates to a bottommost position approximately in line with the transmission unit housing to minimize capture of the randomized kinetic energy.

8. The apparatus of claim 1, further comprising an electrical control module which monitors and regulates voltage being generated by the electrical generation unit.

9. The apparatus of claim 1, further comprising an electrical transmission line for transmitting the electrical charges to an external location.

10. The apparatus of claim 9, wherein the electrical charge is transmitted to the transmission unit via an electrical cable positioned within the actuating arm.

11. The apparatus of claim 1, further comprising a data collection unit which collects data from the electrical control module.

12. The apparatus of claim 1, wherein the collection unit further comprises a third electrical generation unit which converts sliding movement of the collection unit along the actuating arm on a third directional axis into rotational movement of a gear system to drive a third drive shaft which is connected with the third electrical generation unit to generate an electrical charge.

13. The apparatus of claim 12, wherein the gear system comprises a worm gear positioned on the actuating arm.

14. A method of converting wave movement to electrical power comprising the steps of:
    capturing randomized kinetic energy from a wave via a collection unit;
    translating the randomized kinetic energy into pivoting directional movement of the collection unit in at least two directional axes via an actuating arm in fixed connection with the collecting unit, the actuating arm in pivoting rotating connection with a transmission unit via a yolk;
    transforming the pivoting directional movement on a first directional axis into bidirectional torque via a first drive shaft;
    converting the bidirectional torque into an electrical charge via a first electrical generation unit enclosed within the transmission unit; and
    transforming the pivoting directional movement on a second directional axis approximately perpendicular to the first directional axis into rotational movement at a connection point between the transmission unit and at least one external support arm anchoring the transmission unit in the body of water.

15. The method of claim 14, further comprising translating the pivoting directional movement on the second directional axis into torque of a second drive shaft in rotating connection with the connection point between the at least one external support arm and the transmission unit in order to convert the torque into an electrical charge via a geared connection between the second drive shaft and a second electrical generation unit enclosed within the transmission unit.

16. The method of claim 14, further comprising rotating the collection unit along the first directional axis up to approximately 90 degrees in either direction from a topmost position disposed above the transmission unit.

17. The method of claim 16, further comprising rotating the collection unit along the second directional axis up to approximately 90 degrees in either direction from the topmost position.

18. The method of claim 17, further comprising rotating the collection unit to a bottommost position approximately in line with the transmission unit housing to minimize capture of the randomized kinetic energy.

19. The method of claim 14, further comprising converting sliding movement of the collection unit along the actuating arm on a third directional axis into rotational movement of a gear system to drive a third drive shaft which is connected with a third electrical generation unit to generate an electrical charge.

* * * * *